(12) United States Patent
Zhang et al.

(10) Patent No.: US 11,576,142 B2
(45) Date of Patent: Feb. 7, 2023

(54) SYSTEM AND METHOD FOR MULTIPLEXING OF TRACKING REFERENCE SIGNAL AND SYNCHRONIZATION SIGNAL BLOCK

(71) Applicant: Apple Inc., Cupertino, CA (US)

(72) Inventors: Yushu Zhang, Beijing (CN); Guotong Wang, Beijing (CN); Alexei Davydov, Nizhny Novgorod (RU); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/637,666

(22) PCT Filed: Aug. 8, 2018

(86) PCT No.: PCT/US2018/045862
§ 371 (c)(1),
(2) Date: Feb. 7, 2020

(87) PCT Pub. No.: WO2019/032737
PCT Pub. Date: Feb. 14, 2019

(65) Prior Publication Data
US 2020/0205116 A1 Jun. 25, 2020

Related U.S. Application Data

(60) Provisional application No. 62/567,033, filed on Oct. 2, 2017.

(30) Foreign Application Priority Data

Aug. 8, 2017 (WO) .................. PCT/CN17/96423

(51) Int. Cl.
*H04L 5/00* (2006.01)
*H04W 64/00* (2009.01)
(Continued)

(52) U.S. Cl.
CPC .......... *H04W 64/003* (2013.01); *H04L 1/203* (2013.01); *H04L 5/0007* (2013.01);
(Continued)

(58) Field of Classification Search
None
See application file for complete search history.

(56) References Cited

U.S. PATENT DOCUMENTS

2014/0314000 A1* 10/2014 Liu ..................... H04W 72/042
370/329
2015/0036653 A1* 2/2015 Kim ..................... H04L 5/0025
370/330
(Continued)

OTHER PUBLICATIONS

LG Electronics 3GPP TSG RAN WG1 Meeting #89 R1-1707590 Hangzhou, P.R. China May 15-19, 2017 all pages (Year: 2017).*
(Continued)

*Primary Examiner* — Brandon M Renner
(74) *Attorney, Agent, or Firm* — Sterne, Kessler, Goldstein & Fox P.L.L.C.

(57) ABSTRACT

Described is an apparatus of a User Equipment (UE) operable to communicate with a fifth-generation Evolved Node-B (gNB) on a wireless network. The apparatus may comprise a first circuitry and a second circuitry. The first circuitry may be operable to process a Tracking Reference Signal (TRS) transmission and to process a Synchronization Signal block (SS-block) transmission. The second circuitry may be operable to measure a reference signal parameter based on the TRS transmission and the SS-block transmission.

25 Claims, 16 Drawing Sheets

(51) Int. Cl.

| | |
|---|---|
| *H04W 76/28* | (2018.01) |
| *H04L 1/20* | (2006.01) |
| *H04W 56/00* | (2009.01) |
| *H04W 72/00* | (2009.01) |
| *H04W 72/04* | (2009.01) |
| *H04W 80/08* | (2009.01) |

(52) U.S. Cl.
CPC ......... *H04L 5/0051* (2013.01); *H04W 56/001* (2013.01); *H04W 72/005* (2013.01); *H04W 72/0446* (2013.01); *H04W 76/28* (2018.02); *H04W 80/08* (2013.01)

(56) References Cited

U.S. PATENT DOCUMENTS

| | | | |
|---|---|---|---|
| 2015/0063140 A1 | 3/2015 | Yi et al. | |
| 2015/0092691 A1* | 4/2015 | Hwang | H04W 52/267 370/329 |
| 2015/0139113 A1* | 5/2015 | You | H04W 56/0015 370/329 |
| 2015/0304995 A1* | 10/2015 | Yi | H04L 5/0007 370/329 |
| 2015/0358848 A1* | 12/2015 | Kim | H04L 5/0053 370/252 |
| 2016/0174247 A1* | 6/2016 | Ruiz Delgado | H04W 28/18 370/329 |
| 2018/0205526 A1* | 7/2018 | Kim | H04L 5/00 |
| 2019/0081759 A1* | 3/2019 | Wang | H04L 5/0091 |
| 2019/0306847 A1* | 10/2019 | Seo | H04L 25/022 |
| 2020/0099437 A1* | 3/2020 | Harada | H04W 76/19 |
| 2020/0145082 A1* | 5/2020 | Chen | H04W 72/042 |
| 2020/0244337 A1* | 7/2020 | Yuan | H04W 72/0466 |

OTHER PUBLICATIONS

Search Report and Written Opinion for PCT Appl. No. PCT/US2018/045862, dated Jan. 1, 2019, 17 pages.

Apple Inc., "Configuration of Synchronization and Tracking RS in wideband carrier," 3GPP TSG-RAN WG1 #89, R1-1708278, downloaded from http://www.3gpp.org/ftp/Meetings_3GPP_SYNC/RAN1/Docs/, Hangzhou, P.R. China, 2017, 3 pages.

Samsung, "Remaining issues of NR-PBCH," 3GPP TSG-RAN WG1 #89, R1-1709180, downloaded from http://www.3gpp.org/Meetings_03GPP_SYNC/RAN1/Docs/, Hangzhou, P.R. China, 2017, 9 pages.

Mediatek Inc., "On TRS design requirement," 3GPP TSG-RAN WG1 Meeting NR Ad-Hoc#2, R1-1710832, downloaded from http://www.3gpp.org/ftp/Meetings_3GPP_SYNC/RAN1/Docs/, Qingdao, China, 2017, 18 pages.

Ericsson, "The QCL framework in NR," 3GPP TSG-RAN WG1 #89ah-NR, R1-1711051, downloaded from http://www.3gpp.org/ftp/Meetings_3GPP_SYNC/RAN1/Docs/, Hangzhou, P.R. China, 2017, 6 pages.

* cited by examiner

US 11,576,142 B2

SYSTEM AND METHOD FOR MULTIPLEXING OF TRACKING REFERENCE SIGNAL AND SYNCHRONIZATION SIGNAL BLOCK

CLAIM OF PRIORITY

The present application claims priority under 35 U.S.C. § 365 to Patent Cooperation Treaty International Patent Application Number PCT/CN2017/096423 filed Aug. 8, 2017 and entitled "MULTIPLEXING OF TRACKING REFERENCE SIGNAL AND SYNCHRONIZATION SIGNAL BLOCK," and claims priority under 35 U.S.C. § 119 to U.S. Provisional Patent Application Ser. No. 62/567,033 filed Oct. 2, 2017 and entitled "USER EQUIPMENT TRIGGERED TRACKING REFERENCE SIGNAL," which are herein incorporated by reference in their entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/ 5G mobile networks system. Next-generation wireless cellular communication systems may provide support for higher bandwidths in part by supporting beamforming.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

With respect to various embodiments, a Tracking Reference Signal (TRS) may be used for fine time tracking and frequency tracking, by which one or more of a time offset, a frequency offset, and a Doppler offset may be estimated so that a receiver may estimate a coefficient to construct a Wiener filter for channel estimation purposes. For single-beam systems, a TRS may be transmitted in one time instance within a given time window. For multi-beam systems, a TRS may be disposed to being transmitted repeatedly by different beams, so that a User Equipment (UE) may track either or both of a time offset or a frequency offset for different beams.

For NR systems, a number N of Synchronization Signal blocks (SS-blocks) comprising one or more of a Primary Synchronization Signal (PSS), a Secondary Synchronization Signal (SSS), and Physical Broadcasting Channel (PBCH) may be transmitted within a time window. A number N of beams may then be applied to those SS-blocks.

Figure 1:
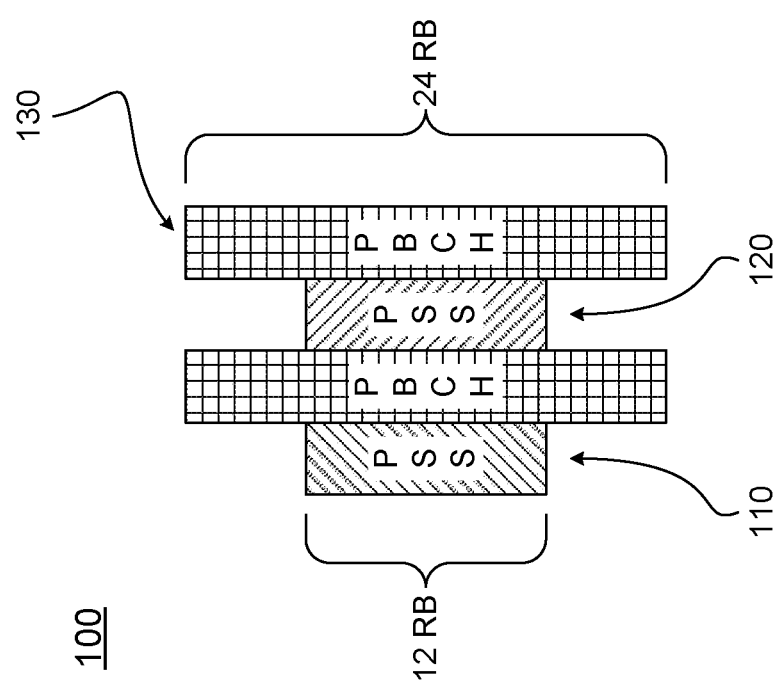
FIG. 1 illustrates a scenario of a Synchronization Signal block (SS-block), in accordance with some embodiments of the disclosure.

FIG. 1 illustrates a scenario of an SS-block, in accordance with some embodiments of the disclosure. An SS-block 100 may comprise a PSS portion 110, an SSS portion 120, and one or more PBCH portions 130. In various embodiments, for SS-block 100, PSS portion 110 and SSS portion 120 may span 12 Resource Blocks (RBs), and PBCH portions 130 may span 24 RBs.

An SS-block may accordingly be used for measurement of Reference Signal Received Power (RSRP). However, due to bandwidth limitations, measurement accuracy may be problematic.

Figure 2:
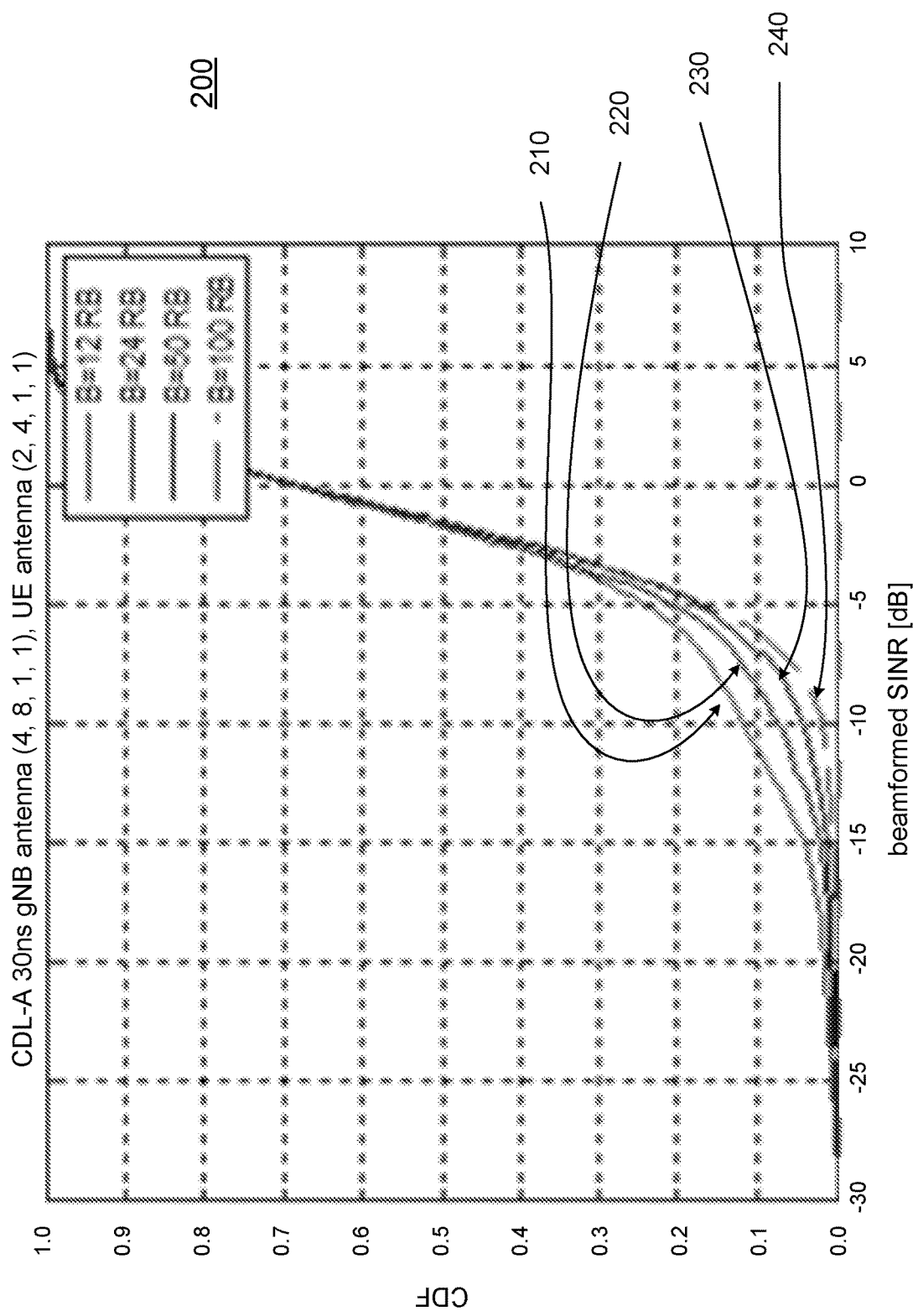
FIG. 2 illustrates a scenario of link-level simulation results for different numbers of Resource Blocks (RBs) for reference signal measurement, in accordance with some embodiments of the disclosure.

FIG. 2 illustrates a scenario of link-level simulation results for different numbers of RBs for reference signal measurement, in accordance with some embodiments of the disclosure. A scenario 200 depicts link level simulation results for Cumulative Distribution Functions (CDFs) of beamformed Signal-to-Interference-Noise Ratio (SINR) with selected beams based on the measurement of four candidate beams in one slot, where a variable B indicates a bandwidth of the reference signal. A first CDF 210 pertains to a B of 12 RBs, a second CDF 220 pertains to a B of 24 RBs, a third CDF 230 pertains to a B of 50 RBs, and a fourth CDF 240 pertains to a B of 100 RBs.

By using merely an SS-block, there may be some performance loss. One possible means of addressing this may be to use some additional signal to increase the RSRP measurement accuracy. Since the SS-block and TRS may be transmitted multiple times in a time window for multi-beam operation, multiplexing the SS-block and TRS may be problematic.

Disclosed herein are various mechanisms and methods for transmitting SS-block and TRS. Some embodiments may pertain to handling of collisions between SS-block and TRS. Some embodiments may pertain to numerologies and transmission power of SS-block and TRS. The various mechanisms and methods may facilitate multiplexing of SS-block and TRS (e.g., for multi-beam operation).

With respect to various embodiments, for multi-beam operation, the time offset and/or frequency offset may be different in beam pair links (BPLs) between different 5G-capable or NR-capable eNBs (or gNBs) and UEs. After a long Discontinuous Reception (DRX), a UE may be disposed to tracking time and frequency again. One possible way of doing so may be for a gNB to configure a TRS transmission to be at a slot before DRX (e.g., a slot immediately before DRX). The UE may then perform time offset and/or frequency offset tracking after the DRX. However, since multiple UEs may have different DRX cycles, it may be hard for a gNB to always keep the TRS at slots after a DRX, for all UEs.

Moreover, a UE may change its Receiving (Rx) beam after some measurement of SS-block or Channel State Information Reference Signal (CSI-RS). A timing offset or frequency offset may then be different for new BPLs. Accordingly, it may be advantageous for a UE to trigger an TRS transmission.

Disclosed herein are various mechanisms and methods for enabling UE-triggered TRS transmissions. Some embodiments may pertain to conditions for UE-triggered TRS transmissions. Some embodiments may pertain to operation of UE-triggered TRS transmissions. The various mechanisms and methods may facilitate UE triggering of TRS transmission (e.g., to better accommodate long DRX).

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various RBs, Physical Resource Blocks (PRBs), and/or time periods (e.g., frames, subframes, and/or slots) of a wireless communication system. In some embodiments, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

With respect to a variety of embodiments, both SS-block and TRS may be transmitted multiple times for multi-beam operation. For RSRP measurement purposes, it may be better to have a wider bandwidth reference signal, which may advantageously increase a measurement accuracy. For time offset tracking, wider bandwidth and/or a higher density may also advantageously increase accuracy. For frequency tracking, multiple time instances or symbols may be advantageous. As a result, transmitting SS-block and TRS in one slot, where the TRS and SS-block are transmitted using the same Transmitting (Tx) beam, may advantageously increase both RSRP measurement accuracy, time offset tracking performance, and/or frequency offset tracking performance.

In general, when calculating RSRP, a UE may average a received power over all the resource elements occupied by SS-block and TRS. Note that as discussed herein, an SS-block may indicate an actually-transmitted SS-block instead of a potentially transmitted SS-block. Also, note that the TRS may be a new reference signal, or may be some other Downlink (DL) reference signal or signals, such as CSI-RS, Demodulation reference signal (DM-RS), and so on.

Figure 3:
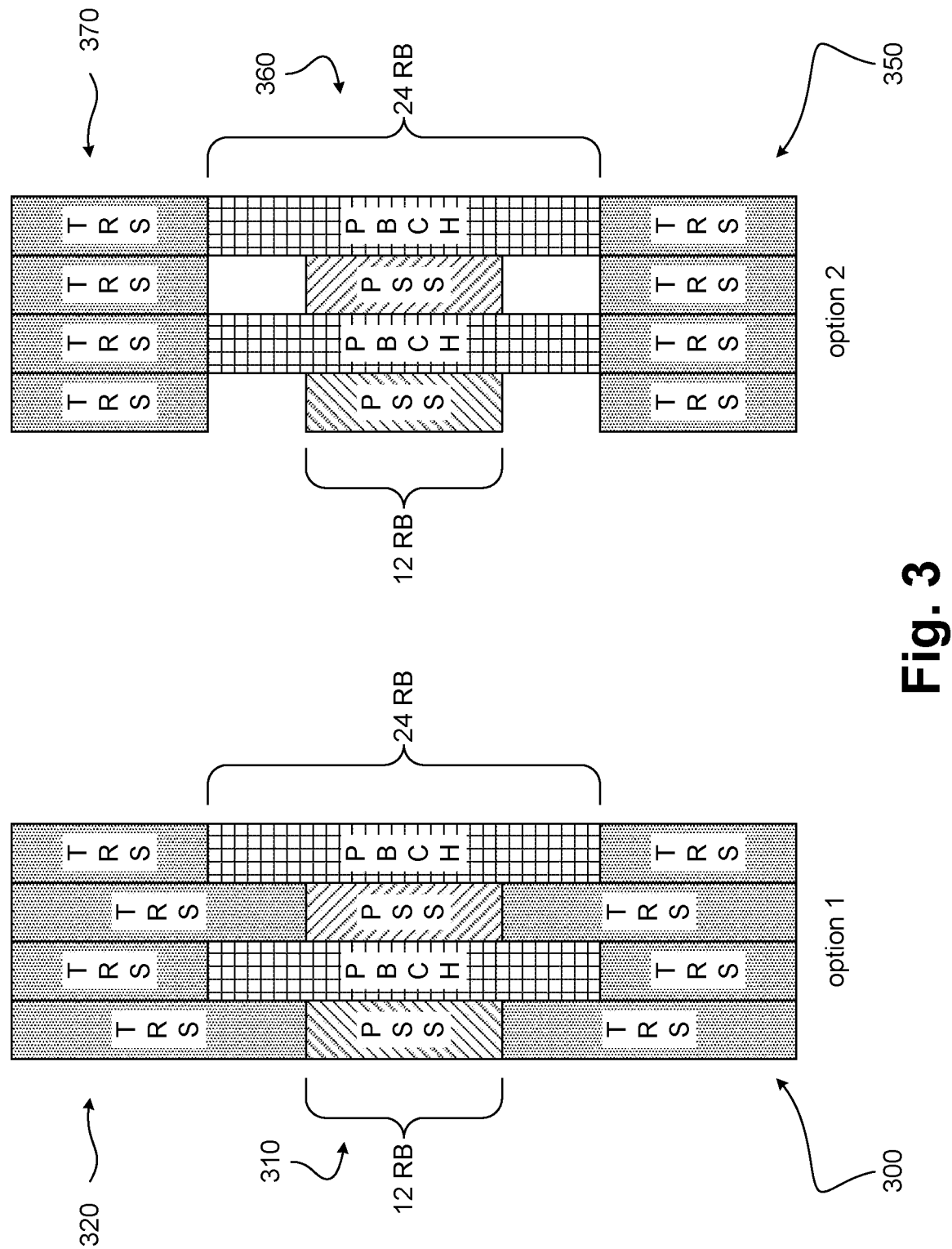
FIG. 3 illustrates a scenario of Tracking Reference Signal (TRS) and SS-block multiplexing in a Frequency Division Multiplexing (FDM) manner, in accordance with some embodiments of the disclosure.

FIG. 3 illustrates a scenario of TRS and SS-block multiplexing in a Frequency Division Multiplexing (FDM) manner, in accordance with some embodiments of the disclosure. In a first option 300, an SS-block portion 310 may be adjacent to one or more TRS portions 320. TRS portions 320 may extend from frequencies adjacent to the frequencies of PSS, SSS, and PBCH of SS-block portion 310. In a second option 350, an SS-block portion 360 may be adjacent to one or more TRS portion 370. TRS portions 370 may extend from frequencies adjacent to the frequencies of PBCH of SS-block portion 360 (and may not extend from frequencies adjacent to the frequencies of PSS and SSS of SS-block portion 360).

Accordingly, in some embodiments, SS-block and TRS (e.g., SS-block portions and TRS portions) may be multiplexed in an FDM manner. TRS may be allocated to one or more subcarriers in a number K of RBs and/or in a number L of symbols outside of the RBs used for PSS and SSS, or the RBs used for PBCH (e.g., the 12 RBs used for PSS and SSS, and/or the 24 RBs used for PBCH). The number K and/or the number L may be pre-defined or otherwise predetermined, or may be configured (e.g., by higher-layer signaling). The RB indices of the number K of RBs may be pre-defined, e.g. to be symmetric around the SS-block, or may be configured by higher layer signaling. In some embodiments, if the number L is less than 4, a priority of the symbols for TRS (e.g., the OFDM symbols) may be in the order of SSS, then a 1st and/or 2nd symbol of PBCH, then PSS. In some embodiments, the option to be used (e.g., first option 300 or second option 350) may be pre-defined or otherwise predetermined, or may be configured (e.g., by higher-layer signaling), or may be determined by a number of RBs and/or a number of symbols for TRS.

The SS-block Antenna Port (AP) and the TRS AP may be the same, or may be Quasi-Co-Located (QCLed). Accordingly, both TRS and SS-block (e.g., PSS, SSS, and/or PBCH) may be used for measurement and fine time/frequency tracking. An Energy Per Resource Element (EPRE) ratio between an SS-block (e.g., PSS, SSS, and/or PBCH) and TRS may be pre-defined or otherwise predetermined, or may be configured by higher-layer signaling, so that some power boosting may be used for SS-block, which may advantageously improve the performance of initial-access related procedures.

Furthermore, a numerology of TRS may be the same as that of an SS-block or may be different from that of an SS-block, and the numerology may be pre-defined or otherwise predetermined, or may be configured by higher-layer signaling. In some embodiments, whether to use first option 300 or second option 350 may be determined by whether the same numerologies are used for SS-block and TRS, or whether different numerologies are used for SS-block and TRS.

Figure 4:
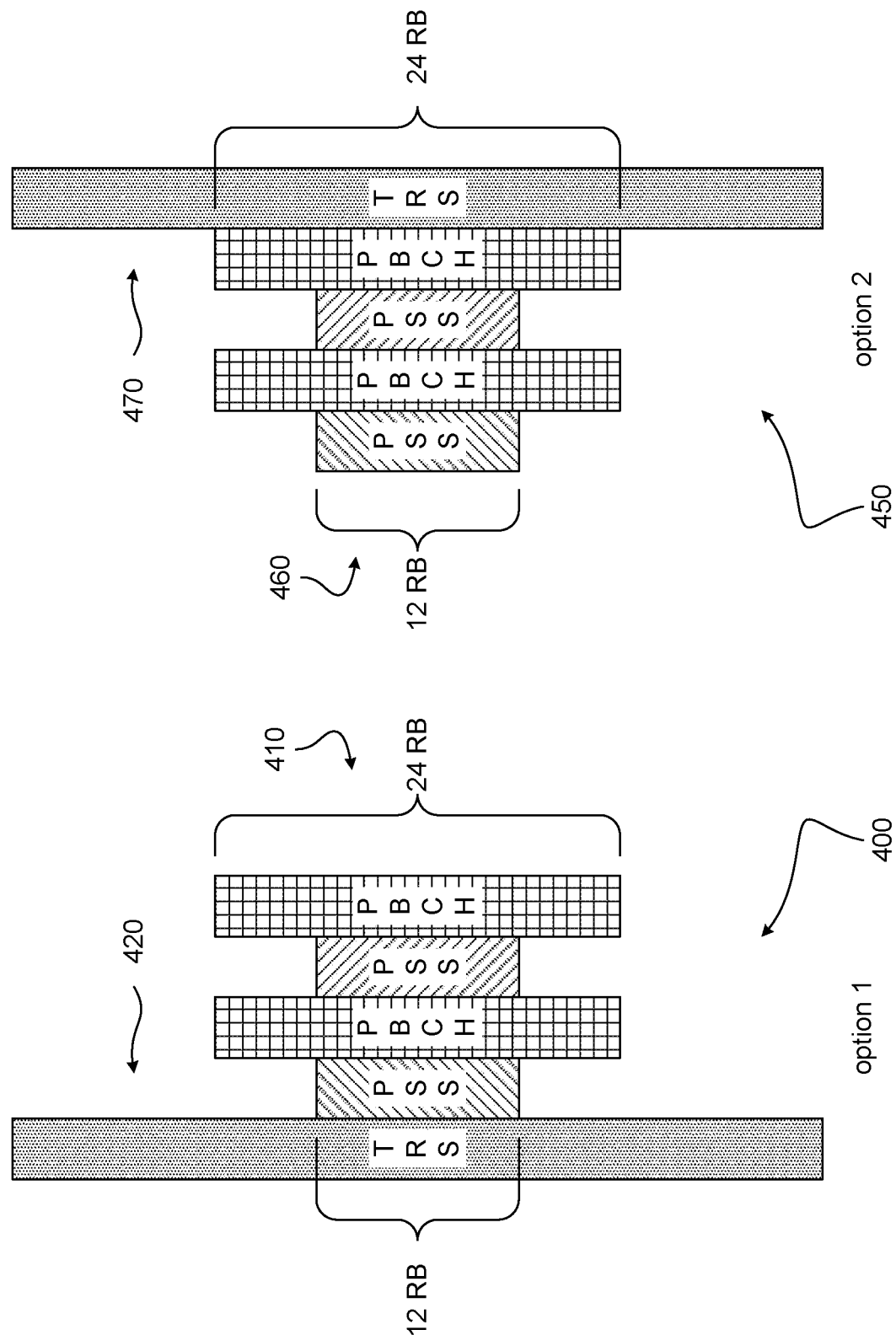
FIG. 4 illustrates a scenario of TRS and SS-block multiplexing in a Time Division Multiplexing (TDM) manner, in accordance with some embodiments of the disclosure.

FIG. 4 illustrates a scenario of TRS and SS-block multiplexing in a Time Division Multiplexing (TDM) manner, in accordance with some embodiments of the disclosure. In a first option 400, an SS-block portion 410 may be adjacent to a TRS portion 420. TRS portion 420 may span one or more OFDM symbols preceding the OFDM symbols of SS-block portion 410. In a second option 450, an SS-block portion 460 may be adjacent to a TRS portion 470. TRS portion 470 may span one or more OFDM symbols following the OFDM symbols of SS-block portion 460.

In some embodiments, the SS-block and TRS (e.g., SS-block portions and TRS portions) may be multiplexed in a TDM manner. The TRS may be transmitted in one or more symbols before an SS-block (e.g., as in first option 400), or in one or more symbols after an SS-block (e.g., as in second option 450). A time offset may then be estimated by TRS, and a frequency offset may be estimated by TRS and/or SS-block. An RSRP measurement may be based on TRS and SS-block (e.g., PSS, SSS, and/or PBCH), and/or DM-RS of PBCH.

In various embodiments, an SS-block and TRS may be configured independently. Then, if a collision between the SS-block and TRS happens, one of the following options may be used. In a first option, TRS might not be transmitted. In a second option, TRS may be muted or punctured at the bandwidth of PSS, SSS, and/or PBCH (such as in FIG. 3). In a third option, TRS may be shifted to one or more other symbols (such as in FIG. 4). The option to be used may be pre-defined or otherwise predetermined, or may be configured by higher-layer signaling, or may be determined by a subcarrier spacing of SS-block and TRS and/or a system bandwidth.

In some embodiments, the presence of TRS may also be determined by a system bandwidth. For example, if the system bandwidth is equal to that of PBCH, TRS might not be transmitted.

With respect to various embodiments, various conditions may pertain to UE-triggered TRS. In some embodiments, a UE may be configured with a periodic TRS, where each periodic TRS may include at least one TRS burst. To support multiple-beam operation, multiple TRS bursts may be transmitted with a beam sweeping operation. The periodicity of TRS may in turn increase in order to better support more TRS bursts. A UE may then be disposed to trigger the TRS.

Figure 5:
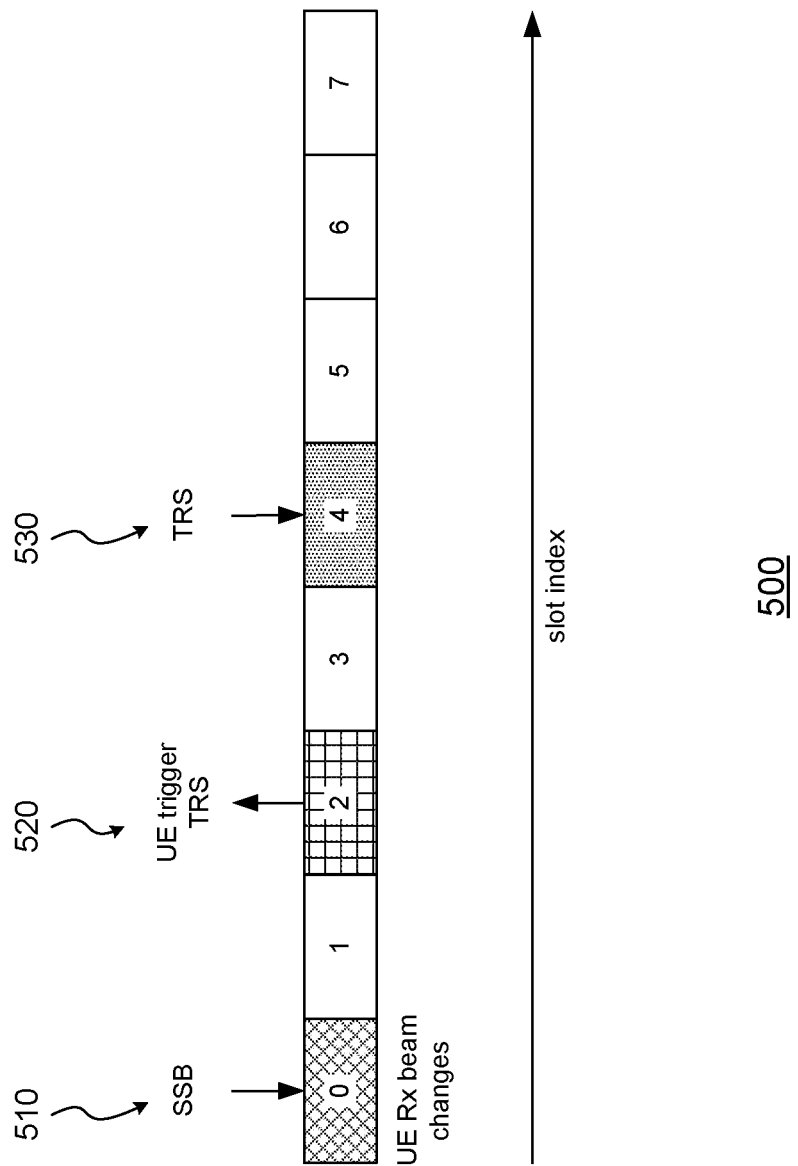
FIG. 5 illustrates a scenario of User Equipment (UE) triggered TRS when a Receiving (Rx) beam changes, in accordance with some embodiments of the disclosure.

In order to advantageously avoid unnecessary triggering of TRS, in various embodiments, one or more of the following conditions may be used to judge whether or not a UE may trigger TRS. Under a first condition, a UE may trigger TRS when a TRS periodicity is above a threshold, or when no TRS is configured. Under a second condition, a UE may trigger TRS when a gNB configures the UE to trigger TRS. Under a third condition, a UE may trigger TRS when a hypothetical Block Error Ratio (BLER) of Physical Downlink Shared Channel (PDSCH) or a hypothetical BLER of Physical Downlink Control Channel (PDCCH) falls below a threshold (which may be predefined or otherwise predetermined, or may be configured by higher-layer signaling). Under a fourth condition, a UE may trigger TRS when a UE Rx beam changes, as shown in FIG. 5. Under a fifth condition, a UE may trigger TRS when a DRX duration is above a threshold duration (which may be predefined or otherwise predetermined, or may be configured by higher-layer signaling), as shown in FIG. 6.

FIG. 5 illustrates a scenario of User Equipment (UE) triggered TRS when a Rx beam changes, in accordance with some embodiments of the disclosure. A plurality of slots 500 may comprise an SS-block slot 510, a UE-triggering TRS slot 520, and a TRS slot 530. In SS-block slot 510, a UE Rx beam may change. In UE-triggering TRS slot 520, the UE may trigger TRS. In TRS slot 530, the UE may receive TRS.

Figure 6:
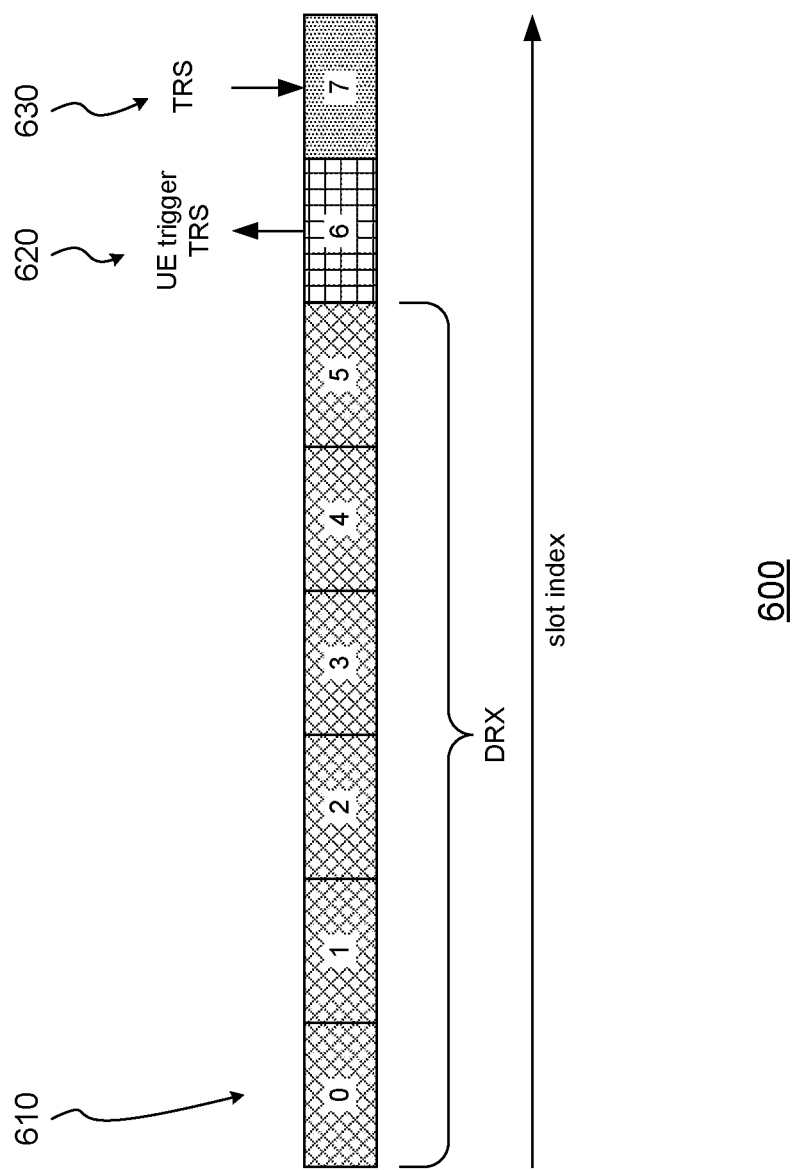
FIG. 6 illustrates a scenario of UE triggered TRS for a long Discontinuous Reception (DRX), in accordance with some embodiments of the disclosure.

FIG. 6 illustrates a scenario of UE triggered TRS for a long DRX, in accordance with some embodiments of the disclosure. A plurality of slots 600 may comprise one or more DRX slots 610, a UE-triggering TRS slot 620, and a TRS slot 630. A duration of DRX slots 610 may be above a threshold duration. In UE-triggering TRS slot 620, the UE may trigger TRS. In TRS slot 630, the UE may receive TRS.

In some embodiments, if a beam indication from a gNB indicates that a UE may be disposed to change its Rx beam or Tx beam, after the UE reports an acknowledgement of a beam switching message, the gNB could configure a TRS transmission in the slot where a PDSCH transmission begins. An example is depicted in FIG. 7.

Figure 7:
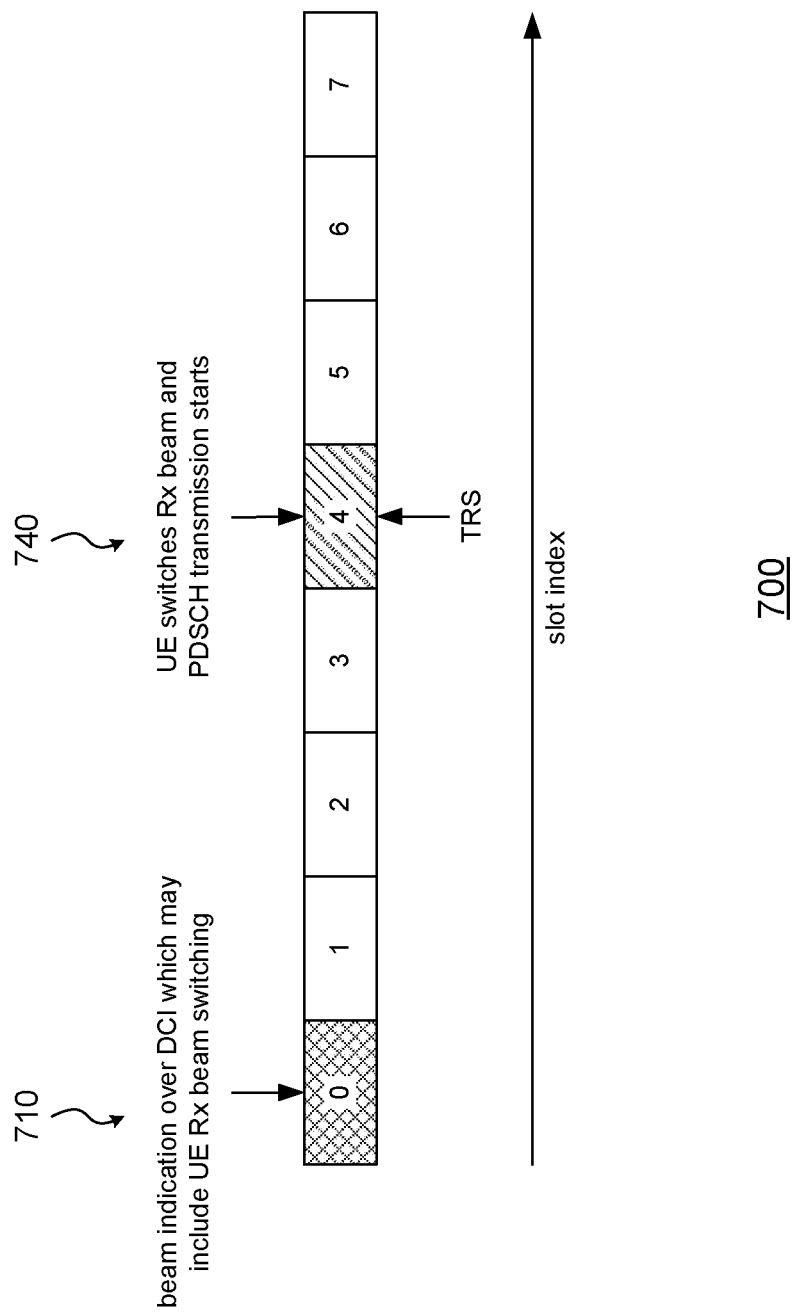
FIG. 7 illustrates a scenario of TRS transmission for beam indication with a UE Rx beam change, in accordance with some embodiments of the disclosure.

FIG. 7 illustrates a scenario of TRS transmission for beam indication with a UE Rx beam change, in accordance with some embodiments of the disclosure. A plurality of slots 700 may comprise a beam indication slot 710 and a UE Rx beam switching slot 740. In beam indication slot 710, a UE may receive a beam indication over Downlink Control Information (DCI), which may include an indication of UE Rx beam switching. In UE Rx beam switching slot 740, the UE may switch an Rx beam, and a PDSCH transmission may start.

In some embodiments, if a beam indication is included in a UE-specific DCI scheduling a DL data transmission, a timer-based solution may be employed to advantageously facilitate or ensure alignment between a gNB and a UE on the BPL associated for TRS transmission. More specifically, TRS may be transmitted in a number of slots n+k, associated with a beam indication in a DCI in a slot n scheduling DL data transmission, where k may be predefined or otherwise predetermined (e.g., by specification), or may be configured by higher layers via NR Minimum System Information (MSI), NR Remaining Minimum System Information (RMSI), NR Other System Information (OSI), or Radio Resource Control (RRC) signaling.

Alternatively, in some embodiments, TRS may be associated with a beam indication a number k of slots after an Acknowledgement (ACK) response is received at a gNB.

In various embodiments, there may be two issues for the operation of UE triggered TRS. One issue may pertain to how to transmit a TRS request. Another issue may pertain to a gNB's response and UE behavior.

In various embodiments, a TRS request may be carried by Physical Random Access Channel (PRACH), or Physical Uplink Control Channel (PUCCH), or higher-layer signaling, or Media Access Control (MAC) Control Element (MAC-CE), or RRC signaling, or may be combined with a beam recovery request. The TRS request may also carry QCL information and/or Transmission Configuration Indication (TCI) information, which may advantageously be used to identify the gNB beam of the TRS. For example, a UE may request that a gNB transmit a TRS QCLed with a SS-block index y.

Figure 8:
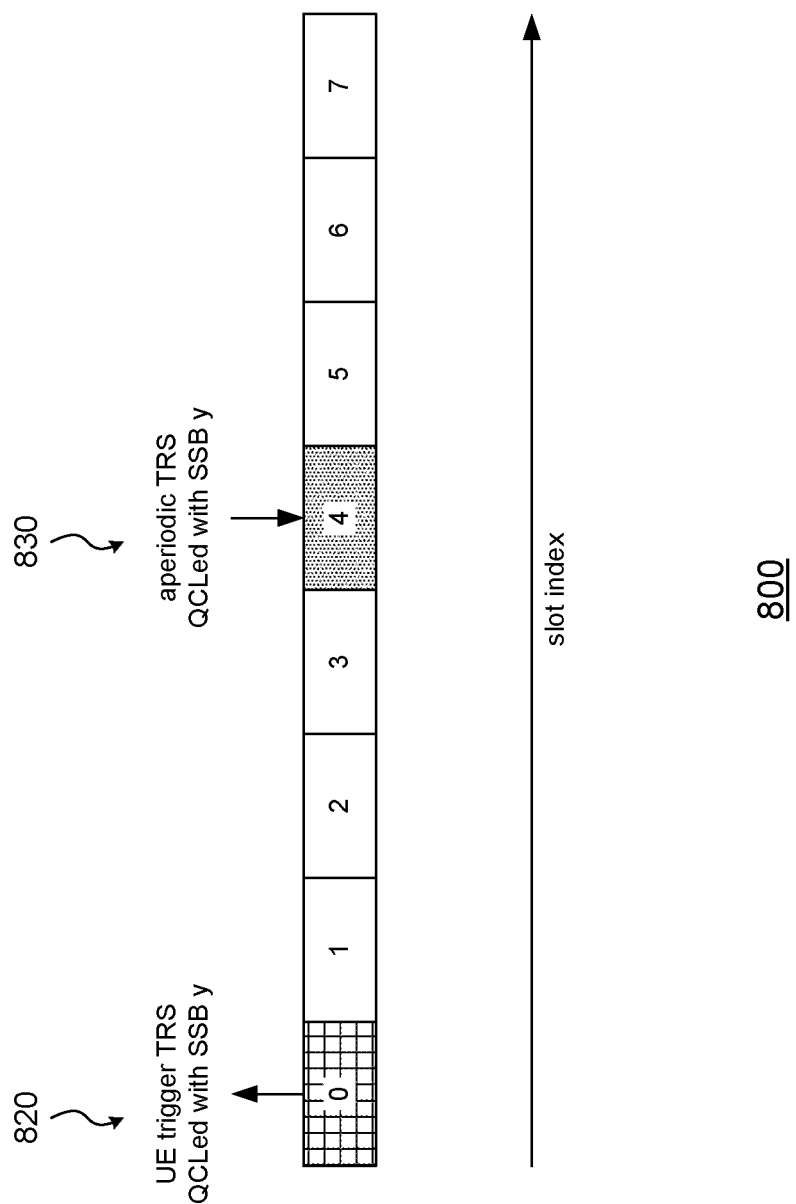
FIG. 8 illustrates a scenario of UE triggered TRS, in accordance with some embodiments of the disclosure.

In some embodiments, if PRACH is used to trigger a TRS request, QCL information may be carried implicitly by PRACH time resources, frequency resources, and/or preamble resources. If PUCCH or higher-layer signaling is used to trigger a TRS request, QCL information may be carried explicitly. FIG. 8 illustrates an exemplary scenario of a TRS request.

FIG. 8 illustrates a scenario of UE triggered TRS, in accordance with some embodiments of the disclosure. A plurality of slots 800 may comprise a UE-triggering TRS slot 820 and an aperiodic TRS slot 830. In UE-triggering slot 820, a UE may trigger TRS QCLed with an SS-block y. In aperiodic TRS slot 830, the UE may receive an aperiodic TRS QCLed with the SS-block y.

In some embodiments, a UE may assume that a gNB would use the same beam as a beam used for SS-block for a follow-up data transmission as well. Furthermore, a gNB may trigger TRS in an aperiodic manner, a semi-persistent manner, or a periodic manner. The gNB may trigger TRS by DCI, by MAC-CE, and/or by RRC signaling.

Figure 9:
FIG. 9 illustrates a scenario of UE triggered TRS, in accordance with some embodiments of the disclosure.

In some embodiments, a UE may suggest a periodicity of TRS. A UE suggested TRS reconfiguration message may be carried by higher-layer signaling. A gNB may then change the periodicity of TRS after successfully decoding the information. FIG. 9 illustrates an exemplary scenario of UE suggesting TRS reconfiguration.

FIG. 9 illustrates a scenario of UE triggered TRS, in accordance with some embodiments of the disclosure. A plurality of slots 900 may comprise a UE periodicity suggestion slot 920 and a TRS reconfiguration slot 930. In UE periodicity suggestion slot 920, a UE may suggest a periodicity x of TRS. In TRS reconfiguration slot 930, the UE may receive TRS reconfiguration with the periodicity x.

In some embodiments, a UE may suggest whether TRS should be transmitted during paging cycle or DRX. In some embodiments, a time window may be pre-defined or otherwise predetermined, or may be configured by higher-layer signaling, and if no response from a gNB is received after transmitting the TRS request, a UE may retransmit the request, or may wait until a next TRS transmission. Furthermore, the TRS may be transmitted in an active Bandwidth Part (BWP) regardless of whether the TRS is triggered by the gNB or the UE.

Figure 10:
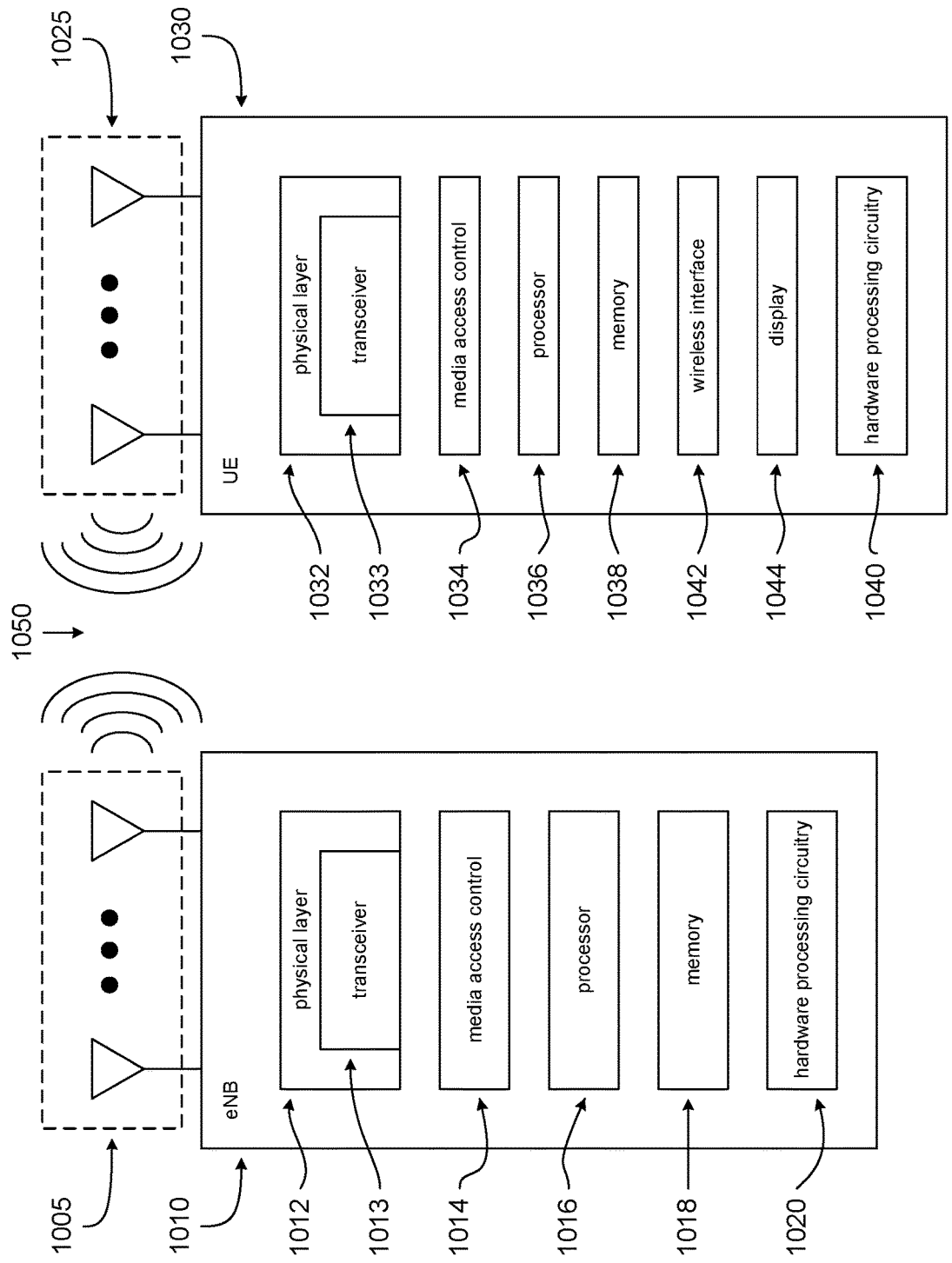
FIG. 10 illustrates an Evolved Node-B (eNB) and a UE, in accordance with some embodiments of the disclosure.

FIG. 10 illustrates an eNB and a UE, in accordance with some embodiments of the disclosure. FIG. 10 includes block diagrams of an eNB 1010 and a UE 1030 which are operable to co-exist with each other and other elements of an LTE network. High-level, simplified architectures of eNB 1010 and UE 1030 are described so as not to obscure the embodiments. It should be noted that in some embodiments, eNB 1010 may be a stationary non-mobile device.

eNB 1010 is coupled to one or more antennas 1005, and UE 1030 is similarly coupled to one or more antennas 1025. However, in some embodiments, eNB 1010 may incorporate or comprise antennas 1005, and UE 1030 in various embodiments may incorporate or comprise antennas 1025.

In some embodiments, antennas 1005 and/or antennas 1025 may comprise one or more directional or omnidirectional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 1005 are separated to take advantage of spatial diversity.

eNB 1010 and UE 1030 are operable to communicate with each other on a network, such as a wireless network. eNB 1010 and UE 1030 may be in communication with each other over a wireless communication channel 1050, which has both a downlink path from eNB 1010 to UE 1030 and an uplink path from UE 1030 to eNB 1010.

As illustrated in FIG. 10, in some embodiments, eNB 1010 may include a physical layer circuitry 1012, a MAC (media access control) circuitry 1014, a processor 1016, a memory 1018, and a hardware processing circuitry 1020. A person skilled in the art will appreciate that other components not shown may be used in addition to the components shown to form a complete eNB.

In some embodiments, physical layer circuitry 1012 includes a transceiver 1013 for providing signals to and from UE 1030. Transceiver 1013 provides signals to and from UEs or other devices using one or more antennas 1005. In some embodiments, MAC circuitry 1014 controls access to the wireless medium. Memory 1018 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 1020 may comprise logic devices or circuitry to perform various operations. In some embodiments, processor 1016 and memory 1018 are arranged to perform the operations of hardware processing circuitry 1020, such as operations described herein with reference to logic devices and circuitry within eNB 1010 and/or hardware processing circuitry 1020.

Accordingly, in some embodiments, eNB 1010 may be a device comprising an application processor, a memory, one or more antenna ports, and an interface for allowing the application processor to communicate with another device.

As is also illustrated in FIG. 10, in some embodiments, UE 1030 may include a physical layer circuitry 1032, a MAC circuitry 1034, a processor 1036, a memory 1038, a hardware processing circuitry 1040, a wireless interface 1042, and a display 1044. A person skilled in the art would appreciate that other components not shown may be used in addition to the components shown to form a complete UE.

In some embodiments, physical layer circuitry 1032 includes a transceiver 1033 for providing signals to and from eNB 1010 (as well as other eNBs). Transceiver 1033 provides signals to and from eNBs or other devices using one or more antennas 1025. In some embodiments, MAC circuitry 1034 controls access to the wireless medium. Memory 1038 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 1042 may be arranged to allow the processor to communicate with another device. Display 1044 may provide a visual and/or tactile display for a user to interact with UE 1030, such as a touch-screen display. Hardware processing circuitry 1040 may comprise logic devices or circuitry to perform various operations. In some embodiments, processor 1036 and memory 1038 may be arranged to perform the operations of hardware processing circuitry 1040, such as operations described herein with reference to logic devices and circuitry within UE 1030 and/or hardware processing circuitry 1040.

Accordingly, in some embodiments, UE 1030 may be a device comprising an application processor, a memory, one or more antennas, a wireless interface for allowing the application processor to communicate with another device, and a touch-screen display.

Elements of FIG. 10, and elements of other figures having the same names or reference numbers, can operate or function in the manner described herein with respect to any such figures (although the operation and function of such elements is not limited to such descriptions). For example, FIGS. 11-12 and 15-16 also depict embodiments of eNBs, hardware processing circuitry of eNBs, UEs, and/or hardware processing circuitry of UEs, and the embodiments described with respect to FIG. 10 and FIGS. 11-12 and 15-16 can operate or function in the manner described herein with respect to any of the figures.

In addition, although eNB 1010 and UE 1030 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 11:
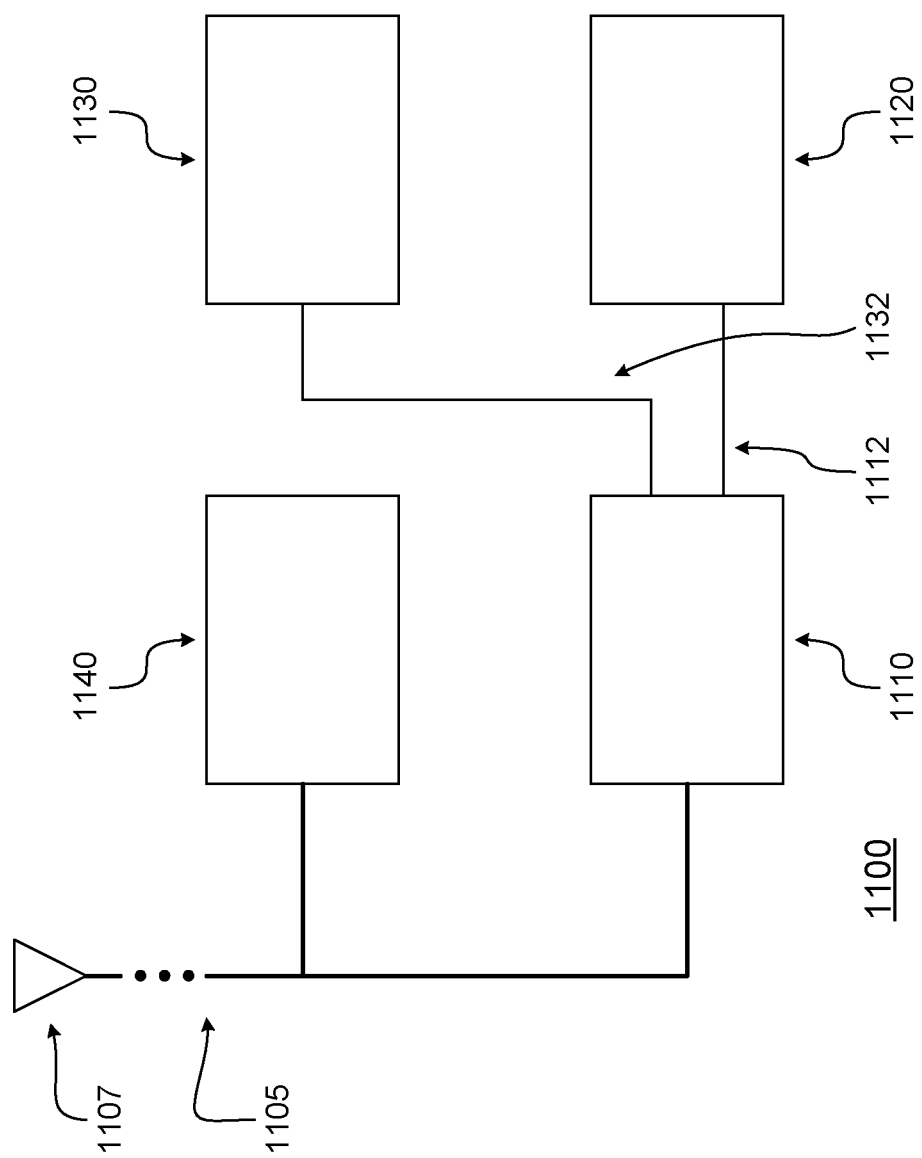
FIG. 11 illustrates hardware processing circuitries for a UE for transmitting SS-block and TRS, in accordance with some embodiments of the disclosure.
Figure 12:
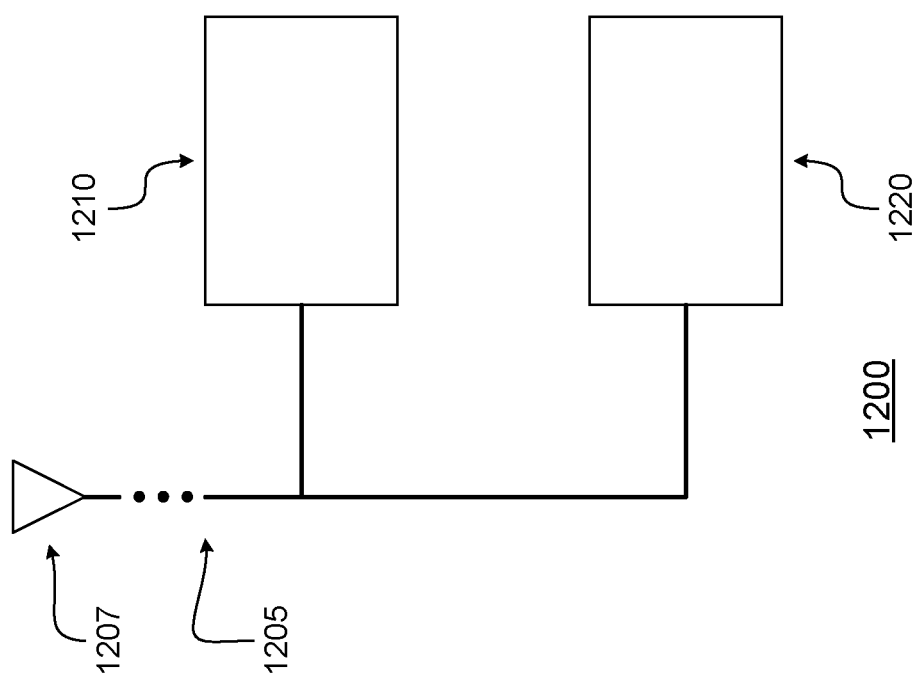
FIG. 12 illustrates hardware processing circuitries for a UE for transmitting SS-block and TRS, in accordance with some embodiments of the disclosure.

FIG. 11 illustrates hardware processing circuitries for a UE for transmitting SS-block and TRS, in accordance with some embodiments of the disclosure. FIG. 12 illustrates hardware processing circuitries for a UE for transmitting SS-block and TRS, in accordance with some embodiments of the disclosure. With reference to FIG. 10, a UE may include various hardware processing circuitries discussed herein (such as hardware processing circuitry 1100 of FIG. 10 and hardware processing circuitry 1200 of FIG. 12), which may in turn comprise logic devices and/or circuitry operable to perform various operations. For example, in FIG. 10, UE 1030 (or various elements or components therein, such as hardware processing circuitry 1040, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 1036 (and/or one or more other processors which UE 1030 may comprise), memory 1038, and/or other elements or components of UE 1030 (which may include hardware processing circuitry 1040) may be arranged to perform the operations of these hardware processing circuitries, such as operations described herein with reference to devices and circuitry within these hardware processing circuitries. In some embodiments, processor 1036 (and/or one or more other processors which UE 1030 may comprise) may be a baseband processor.

Returning to FIG. 11, an apparatus of UE 1030 (or another UE or mobile handset), which may be operable to communicate with one or more eNBs on a wireless network, may comprise hardware processing circuitry 1100. In some embodiments, hardware processing circuitry 1100 may comprise one or more antenna ports 1105 operable to provide various transmissions over a wireless communication channel (such as wireless communication channel 1050). Antenna ports 1105 may be coupled to one or more antennas 1107 (which may be antennas 1025). In some embodiments, hardware processing circuitry 1100 may incorporate antennas 1107, while in other embodiments, hardware processing circuitry 1100 may merely be coupled to antennas 1107.

Antenna ports 1105 and antennas 1107 may be operable to provide signals from a UE to a wireless communications channel and/or an eNB, and may be operable to provide signals from an eNB and/or a wireless communications channel to a UE. For example, antenna ports 1105 and antennas 1107 may be operable to provide transmissions from UE 1030 to wireless communication channel 1050 (and from there to eNB 1010, or to another eNB). Similarly, antennas 1107 and antenna ports 1105 may be operable to provide transmissions from a wireless communication channel 1050 (and beyond that, from eNB 1010, or another eNB) to UE 1030.

Hardware processing circuitry 1100 may comprise various circuitries operable in accordance with the various embodiments discussed herein. With reference to FIG. 11, hardware processing circuitry 1100 may comprise a first circuitry 1110, a second circuitry 1120, a third circuitry 1130, and/or a fourth circuitry 1140.

In a variety of embodiments, first circuitry 1110 may be operable to process a TRS transmission, and may also be operable to process an SS-block transmission. Second circuitry 1120 may be operable to measure a reference signal parameter based on the TRS transmission and the SS block transmission. First circuitry 1110 may be operable to provide information regarding the TRS transmission to second circuitry 1120 via an interface 1112. In various embodiments, hardware processing circuitry 1100 may comprise an interface for receiving the TRS transmission and the SS block transmission from a receiving circuitry.

In some embodiments, the TRS transmission may be received in the same slot as the SS block transmission. For some embodiments, the reference signal parameter may include an RSRP measurement, a Channel State Information (CSI) measurement, and/or a DM-RS measurement.

In some embodiments, third circuitry 1130 may be operable to track at least one of a time offset and a frequency offset based on the TRS transmission. First circuitry 1110 may be operable to provide information regarding TRS transmission to third circuitry 1130 via an interface 1132. For some embodiments, fourth circuitry 1140 may be operable to generate an RSRP report transmission carrying an indicator of the reference signal parameter.

In some embodiments, the TRS transmission and the SS block transmission may be multiplexed in an FDM manner. For some embodiments, the TRS transmission may span a number K of RBs and/or a number L of OFDM symbols. In some embodiments, at least one of the number K and the number L may be determined by a predetermined value, a value configured by higher-layer signaling, and/or a system bandwidth.

For some embodiments, an RB index of the TRS transmission may be determined by a predetermined value and/or a value configured by higher-layer signaling. In some embodiments, a symbol index of the TRS transmission may be determined by a predetermined value and/or a value configured by higher-layer signaling. For some embodiments, an EPRE ratio between the TRS transmission and at least one of a PSS, a SSS, or a PBCH may be determined by a predetermined value and/or a value configured by higher-layer signaling.

In some embodiments, the TRS transmission and the SS block transmission may be multiplexed in a TDM manner. For some embodiments, the TRS transmission may be transmitted in one or more OFDM symbols either before or after the SS block transmission, as determined by a predetermined value and/or a value configured by higher-layer signaling.

In some embodiments, first circuitry 1110, second circuitry 1120, third circuitry 1130, and/or fourth circuitry 1140 may be implemented as separate circuitries. In other embodiments, first circuitry 1110, second circuitry 1120, third circuitry 1130, and/or fourth circuitry 1140 may be combined and implemented together in a circuitry without altering the essence of the embodiments.

Returning to FIG. 12, an apparatus of UE 1030 (or another UE or mobile handset), which may be operable to communicate with one or more eNBs on a wireless network, may comprise hardware processing circuitry 1200. In some embodiments, hardware processing circuitry 1200 may comprise one or more antenna ports 1205 operable to provide various transmissions over a wireless communication channel (such as wireless communication channel 1050). Antenna ports 1205 may be coupled to one or more antennas 1207 (which may be antennas 1025). In some embodiments, hardware processing circuitry 1200 may incorporate antennas 1207, while in other embodiments, hardware processing circuitry 1200 may merely be coupled to antennas 1207.

Antenna ports 1205 and antennas 1207 may be operable to provide signals from a UE to a wireless communications channel and/or an eNB, and may be operable to provide signals from an eNB and/or a wireless communications channel to a UE. For example, antenna ports 1205 and antennas 1207 may be operable to provide transmissions from UE 1030 to wireless communication channel 1050 (and from there to eNB 1010, or to another eNB). Similarly, antennas 1207 and antenna ports 1205 may be operable to provide transmissions from a wireless communication channel 1050 (and beyond that, from eNB 1010, or another eNB) to UE 1030.

Hardware processing circuitry 1200 may comprise various circuitries operable in accordance with the various embodiments discussed herein. With reference to FIG. 12, hardware processing circuitry 1200 may comprise a first circuitry 1210 and/or a second circuitry 1220.

In a variety of embodiments, first circuitry 1210 may be operable to generate an Uplink (UL) transmission carrying a TRS request. Second circuitry 1220 may be operable to process a DL transmission based upon the UL transmission, the DL transmission carrying a TRS response. In various embodiments, hardware processing circuitry 1200 may comprise an interface for sending the UL transmission to a transmission circuitry and/or for receiving the DL from a receiving circuitry.

In some embodiments, the TRS request may be a request for a TRS transmission and/or a request for a TRS reconfiguration transmission. For some embodiments, the UL transmission may be triggered upon: a determination that no TRS is configured; a determination that a TRS periodicity is above a threshold; a determination that a BLER of a PDSCH falls below a threshold value; a determination that a BLER of a PDCCH falls below a threshold value; a determination that a UE Rx beam has changed; and/or a determination that a DRX duration is above a threshold value. In some embodiments, the UL transmission may be a PRACH transmission, a PUCCH transmission, a MAC-CE transmission, an RRC transmission, and/or a transmission associated with a beam recovery request.

For some embodiments, the UL transmission may carry one or more QCL indicators corresponding with the TRS response, and the one or more QCL indicators may identify an SS-block with which the TRS response is to be QCLed and/or a CSI-RS with which the TRS response is to be QCLed. In some embodiments, the one or more QCL indicators may be carried implicitly by one or more PRACH time resources, one or more PRACH frequency resources, and/or one or more PRACH preamble resources. For some embodiments, the one or more QCL indicators may be carried explicitly by a PUCCH and/or higher-layer signaling.

In some embodiment, the UL transmission may carry an indicator of suggested reconfigured TRS periodicity, an indicator of TRS transmission during paging cycle, and/or an indicator of TRS transmission during DRX. For some embodiments, the UE may maintain an indicator of a timing window for TRS response. In some embodiments, upon an expiration of the timing window for TRS response, the UE may initiate a retransmission of the TRS request and/or a TRS reconfiguration request.

For some embodiments, the DL transmission may be processed at a slot number n+k, the number n may be a slot for beam indication signaling and/or feedback of beam indication signaling, and the number k may be established by a predetermined value and/or configured by higher-layer signaling. In some embodiments, the DL transmission may be transmitted in an active BWP.

In some embodiments, first circuitry 1210 and/or second circuitry 1220 may be implemented as separate circuitries. In other embodiments, first circuitry 1210 and/or second circuitry 1220 may be combined and implemented together in a circuitry without altering the essence of the embodiments.

Figure 13:
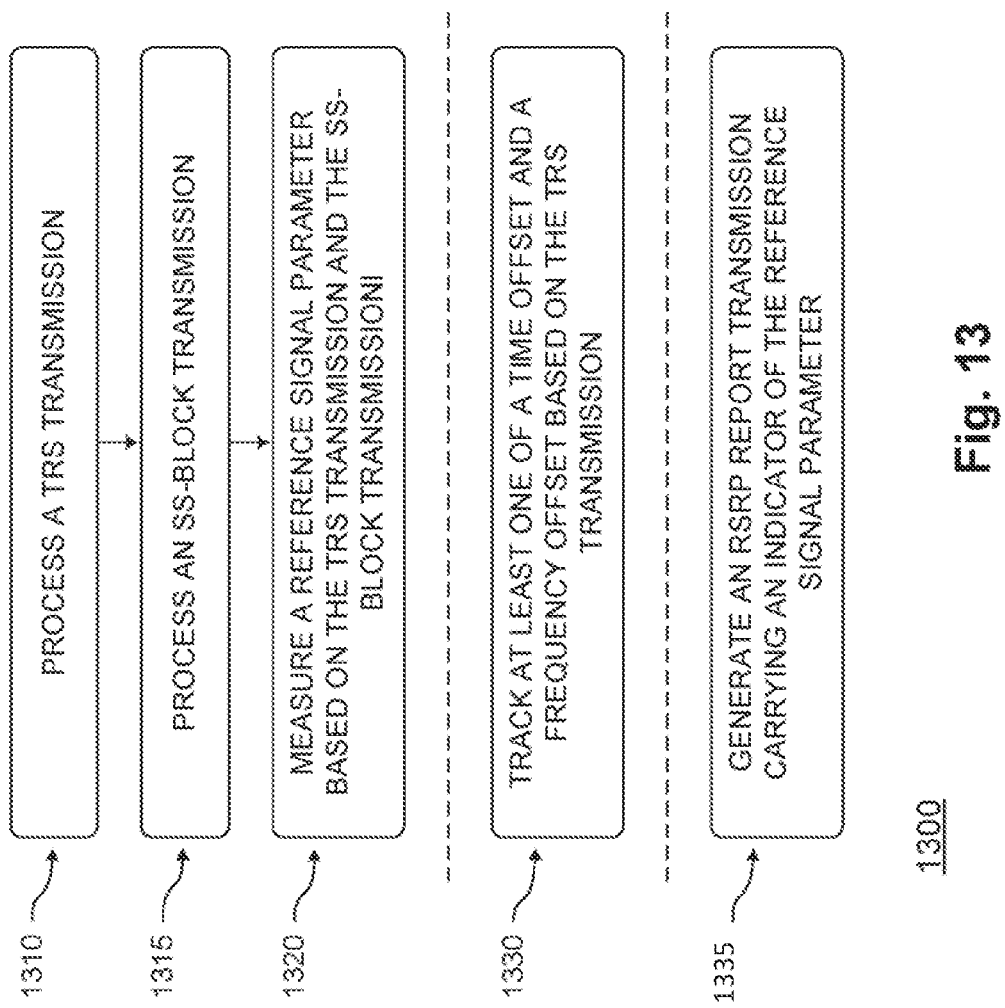
FIG. 13 illustrates methods for a UE for enabling UE-triggered TRS transmissions, in accordance with some embodiments of the disclosure.
Figure 14:
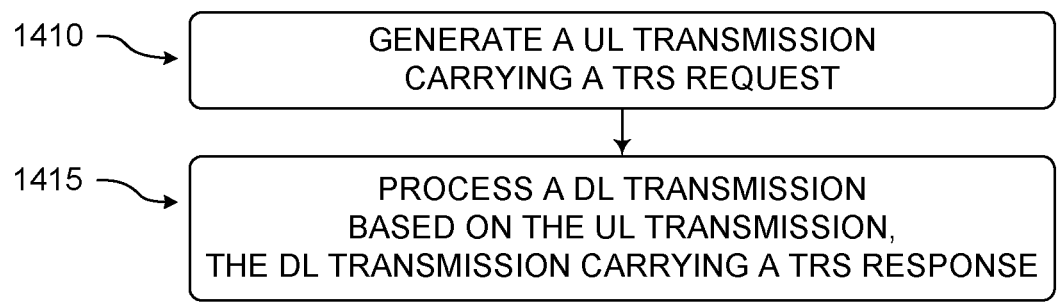
FIG. 14 illustrates methods for a UE for enabling UE-triggered TRS transmissions, in accordance with some embodiments of the disclosure.

FIG. 13 illustrates methods for a UE for enabling UE-triggered TRS transmissions, in accordance with some embodiments of the disclosure. FIG. 14 illustrates methods for a UE for enabling UE-triggered TRS transmissions, in accordance with some embodiments of the disclosure. With reference to FIG. 10, methods that may relate to UE 1030 and hardware processing circuitry 1040 are discussed herein. Although the actions in method 1300 of FIG. 13 and method 1400 of FIG. 14 are shown in a particular order, the order of the actions can be modified. Thus, the illustrated embodiments can be performed in a different order, and some actions may be performed in parallel. Some of the actions and/or operations listed in FIGS. 13 and 14 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 1030 and/or hardware processing circuitry 1040 to perform an operation comprising the methods of FIGS. 13 and 14. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 13 and 14.

Returning to FIG. 13, various methods may be in accordance with the various embodiments discussed herein. A method 1300 may comprise a processing 1310, a processing 1315, and a measuring 1320. Method 1300 may also comprise a tracking 1330 and/or a generating 1335.

In processing 1310, a TRS transmission may be processed. In processing 1315, an SS-block transmission may be processed. In measuring 1320, a reference signal parameter may be measured based on the TRS transmission and the SS-block transmission.

In some embodiments, the TRS transmission may be received in the same slot as the SS block transmission. For some embodiments, the reference signal parameter may include an RSRP measurement, a CSI measurement, and/or a DM-RS measurement.

In tracking 1330, at least one of a time offset and a frequency offset based on the TRS transmission may be tracked. In generating 1335, an RSRP report transmission carrying an indicator of the reference signal parameter may be generated.

In some embodiments, the TRS transmission and the SS block transmission may be multiplexed in an FDM manner. For some embodiments, the TRS transmission may span a number K of RBs and/or a number L of OFDM symbols. In some embodiments, at least one of the number K and the number L may be determined by a predetermined value, a value configured by higher-layer signaling, and/or a system bandwidth.

For some embodiments, an RB index of the TRS transmission may be determined by a predetermined value and/or a value configured by higher-layer signaling. In some embodiments, a symbol index of the TRS transmission may be determined by a predetermined value and/or a value configured by higher-layer signaling. For some embodiments, an EPRE ratio between the TRS transmission and at least one of a PSS, a SSS, or a PBCH may be determined by a predetermined value and/or a value configured by higher-layer signaling.

In some embodiments, the TRS transmission and the SS block transmission may be multiplexed in a TDM manner. For some embodiments, the TRS transmission may be transmitted in one or more OFDM symbols either before or after the SS block transmission, as determined by a predetermined value and/or a value configured by higher-layer signaling.

Returning to FIG. 14, various methods may be in accordance with the various embodiments discussed herein. A method 1400 may comprise a generating 1410 and a processing 1415. In generating 1410, a UL transmission carrying a TRS request may be generated. In processing 1415, a DL transmission based upon the UL transmission may be processed, the DL transmission carrying a TRS response.

In some embodiments, the TRS request may be a request for a TRS transmission and/or a request for a TRS reconfiguration transmission. For some embodiments, the UL transmission may be triggered upon: a determination that no TRS is configured; a determination that a TRS periodicity is above a threshold; a determination that a BLER of a PDSCH falls below a threshold value; a determination that a BLER of a PDCCH falls below a threshold value; a determination that a UE Rx beam has changed; and/or a determination that a DRX duration is above a threshold value. In some embodiments, the UL transmission may be a PRACH transmission, a PUCCH transmission, a MAC-CE transmission, an RRC transmission, and/or a transmission associated with a beam recovery request.

For some embodiments, the UL transmission may carry one or more QCL indicators corresponding with the TRS response, and the one or more QCL indicators may identify an SS-block with which the TRS response is to be QCLed and/or a CSI-RS with which the TRS response is to be QCLed. In some embodiments, the one or more QCL indicators may be carried implicitly by one or more PRACH time resources, one or more PRACH frequency resources, and/or one or more PRACH preamble resources. For some embodiments, the one or more QCL indicators may be carried explicitly by a PUCCH and/or higher-layer signaling.

In some embodiment, the UL transmission may carry an indicator of suggested reconfigured TRS periodicity, an indicator of TRS transmission during paging cycle, and/or an indicator of TRS transmission during DRX. For some embodiments, the UE may maintain an indicator of a timing window for TRS response. In some embodiments, upon an expiration of the timing window for TRS response, the UE may initiate a retransmission of the TRS request and/or a TRS reconfiguration request.

For some embodiments, the DL transmission may be processed at a slot number n+k, the number n may be a slot for beam indication signaling and/or feedback of beam indication signaling, and the number k may be established by a predetermined value and/or configured by higher-layer signaling. In some embodiments, the DL transmission may be transmitted in an active BWP.

Figure 15:
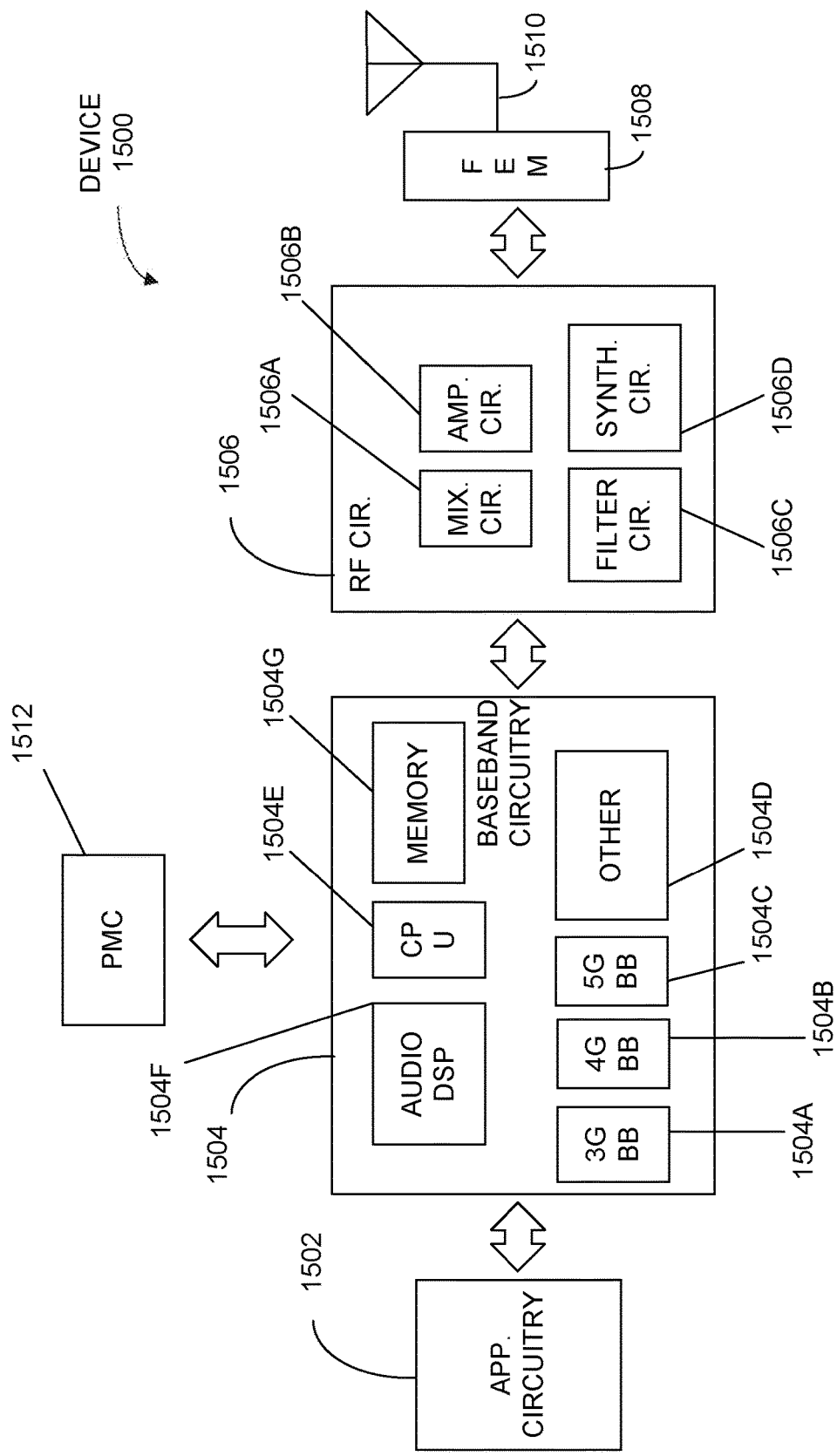
FIG. 15 illustrates example components of a device, in accordance with some embodiments of the disclosure.

FIG. 15 illustrates example components of a device, in accordance with some embodiments of the disclosure. In some embodiments, the device 1500 may include application circuitry 1502, baseband circuitry 1504, Radio Frequency (RF) circuitry 1506, front-end module (FEM) circuitry 1508, one or more antennas 1510, and power management circuitry (PMC) 1512 coupled together at least as shown. The components of the illustrated device 1500 may be included in a UE or a RAN node. In some embodiments, the device 1500 may include less elements (e.g., a RAN node may not utilize application circuitry 1502, and instead include a processor/controller to process IP data received from an EPC). In some embodiments, the device 1500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 1500. In some embodiments, processors of application circuitry 1502 may process IP data packets received from an EPC.

The baseband circuitry 1504 may include circuitry such as, but not limited to, one or more single-core or multi-core processors. The baseband circuitry 1504 may include one or more baseband processors or control logic to process baseband signals received from a receive signal path of the RF circuitry 1506 and to generate baseband signals for a transmit signal path of the RF circuitry 1506. Baseband processing circuity 1504 may interface with the application circuitry 1502 for generation and processing of the baseband signals and for controlling operations of the RF circuitry 1506. For example, in some embodiments, the baseband circuitry 1504 may include a third generation (3G) baseband processor 1504A, a fourth generation (4G) baseband processor 1504B, a fifth generation (5G) baseband processor 1504C, or other baseband processor(s) 1504D for other existing generations, generations in development or to be developed in the future (e.g., second generation (2G), sixth generation (6G), and so on). The baseband circuitry 1504 (e.g., one or more of baseband processors 1504A-D) may handle various radio control functions that enable communication with one or more radio networks via the RF circuitry 1506. In other embodiments, some or all of the functionality of baseband processors 1504A-D may be included in modules stored in the memory 1504G and executed via a Central Processing Unit (CPU) 1504E. The radio control functions may include, but are not limited to, signal modulation/demodulation, encoding/decoding, radio frequency shifting, and so on. In some embodiments, modulation/demodulation circuitry of the baseband circuitry 1504 may include Fast-Fourier Transform (FFT), preceding, or constellation mapping/demapping functionality. In some embodiments, encoding/decoding circuitry of the baseband circuitry 1504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include one or more audio digital signal processor(s) (DSP) 1504F. The audio DSP(s) 1504F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1502 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1504 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, and so on to facilitate the communication with the wireless network. RF circuitry 1506 may include a receive signal path which may include circuitry to down-convert RF signals received from the FEM circuitry 1508 and provide baseband signals to the baseband circuitry 1504. RF circuitry 1506 may also include a transmit signal path which may include circuitry to up-convert baseband signals provided by the baseband circuitry 1504 and provide RF output signals to the FEM circuitry 1508 for transmission.

In some embodiments, the receive signal path of the RF circuitry 1506 may include mixer circuitry 1506A, amplifier circuitry 1506B and filter circuitry 1506C. In some embodiments, the transmit signal path of the RF circuitry 1506 may include filter circuitry 1506C and mixer circuitry 1506A. RF circuitry 1506 may also include synthesizer circuitry 1506D for synthesizing a frequency for use by the mixer circuitry 1506A of the receive signal path and the transmit signal path. In some embodiments, the mixer circuitry 1506A of the receive signal path may be configured to down-convert RF signals received from the FEM circuitry 1508 based on the synthesized frequency provided by synthesizer circuitry 1506D. The amplifier circuitry 1506B may be configured to amplify the down-converted signals and the filter circuitry 1506C may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a requirement. In some embodiments, mixer circuitry 1506A of the receive signal path may comprise passive mixers, although the scope of the embodiments is not limited in this respect.

In some embodiments, the mixer circuitry 1506A of the transmit signal path may be configured to up-convert input baseband signals based on the synthesized frequency provided by the synthesizer circuitry 1506D to generate RF output signals for the FEM circuitry 1508. The baseband signals may be provided by the baseband circuitry 1504 and may be filtered by filter circuitry 1506C.

In some embodiments, the mixer circuitry 1506A of the receive signal path and the mixer circuitry 1506A of the transmit signal path may include two or more mixers and may be arranged for quadrature downconversion and upconversion, respectively. In some embodiments, the mixer circuitry 1506A of the receive signal path and the mixer circuitry 1506A of the transmit signal path may include two or more mixers and may be arranged for image rejection (e.g., Hartley image rejection). In some embodiments, the mixer circuitry 1506A of the receive signal path and the mixer circuitry 1506A may be arranged for direct downconversion and direct upconversion, respectively. In some embodiments, the mixer circuitry 1506A of the receive signal path and the mixer circuitry 1506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1504 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506D may be a fractional-N synthesizer or a fractional N/N+1 synthesizer, although the scope of the embodiments is not limited in this respect as other types of frequency synthesizers may be suitable. For example, synthesizer circuitry 1506D may be a delta-sigma synthesizer, a frequency multiplier, or a synthesizer comprising a phase-locked loop with a frequency divider.

The synthesizer circuitry 1506D may be configured to synthesize an output frequency for use by the mixer circuitry 1506A of the RF circuitry 1506 based on a frequency input and a divider control input. In some embodiments, the synthesizer circuitry 1506D may be a fractional N/N+1 synthesizer.

In some embodiments, frequency input may be provided by a voltage controlled oscillator (VCO), although that is not a requirement. Divider control input may be provided by either the baseband circuitry 1504 or the applications processor 1502 depending on the desired output frequency. In some embodiments, a divider control input (e.g., N) may be determined from a look-up table based on a channel indicated by the applications processor 1502.

Synthesizer circuitry 1506D of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1506 may include an IQ/polar converter.

FEM circuitry 1508 may include a receive signal path which may include circuitry configured to operate on RF signals received from one or more antennas 1510, amplify the received signals and provide the amplified versions of the received signals to the RF circuitry 1506 for further processing. FEM circuitry 1508 may also include a transmit signal path which may include circuitry configured to amplify signals for transmission provided by the RF circuitry 1506 for transmission by one or more of the one or more antennas 1510. In various embodiments, the amplification through the transmit or receive signal paths may be done solely in the RF circuitry 1506, solely in the FEM 1508, or in both the RF circuitry 1506 and the FEM 1508.

In some embodiments, the FEM circuitry 1508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission (e.g., by one or more of the one or more antennas 1510).

In some embodiments, the PMC 1512 may manage power provided to the baseband circuitry 1504. In particular, the PMC 1512 may control power-source selection, voltage scaling, battery charging, or DC-to-DC conversion. The PMC 1512 may often be included when the device 1500 is capable of being powered by a battery, for example, when the device is included in a UE. The PMC 1512 may increase the power conversion efficiency while providing desirable implementation size and heat dissipation characteristics.

While FIG. 15 shows the PMC 1512 coupled only with the baseband circuitry 1504. However, in other embodiments, the PMC 1512 may be additionally or alternatively coupled with, and perform similar power management operations for, other components such as, but not limited to, application circuitry 1502, RF circuitry 1506, or FEM 1508.

In some embodiments, the PMC 1512 may control, or otherwise be part of, various power saving mechanisms of the device 1500. For example, if the device 1500 is in an RRC_Connected state, where it is still connected to the RAN node as it expects to receive traffic shortly, then it may enter a state known as Discontinuous Reception Mode (DRX) after a period of inactivity. During this state, the device 1500 may power down for brief intervals of time and thus save power.

If there is no data traffic activity for an extended period of time, then the device 1500 may transition off to an RRC_Idle state, where it disconnects from the network and does not perform operations such as channel quality feedback, handover, and so on. The device 1500 goes into a very low power state and it performs paging where again it periodically wakes up to listen to the network and then powers down again. The device 1500 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1502 and processors of the baseband circuitry 1504 may be used to execute elements of one or more instances of a protocol stack. For example, processors of the baseband circuitry 1504, alone or in combination, may be used execute Layer 3, Layer 2, or Layer 1 functionality, while processors of the application circuitry 1504 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 16:
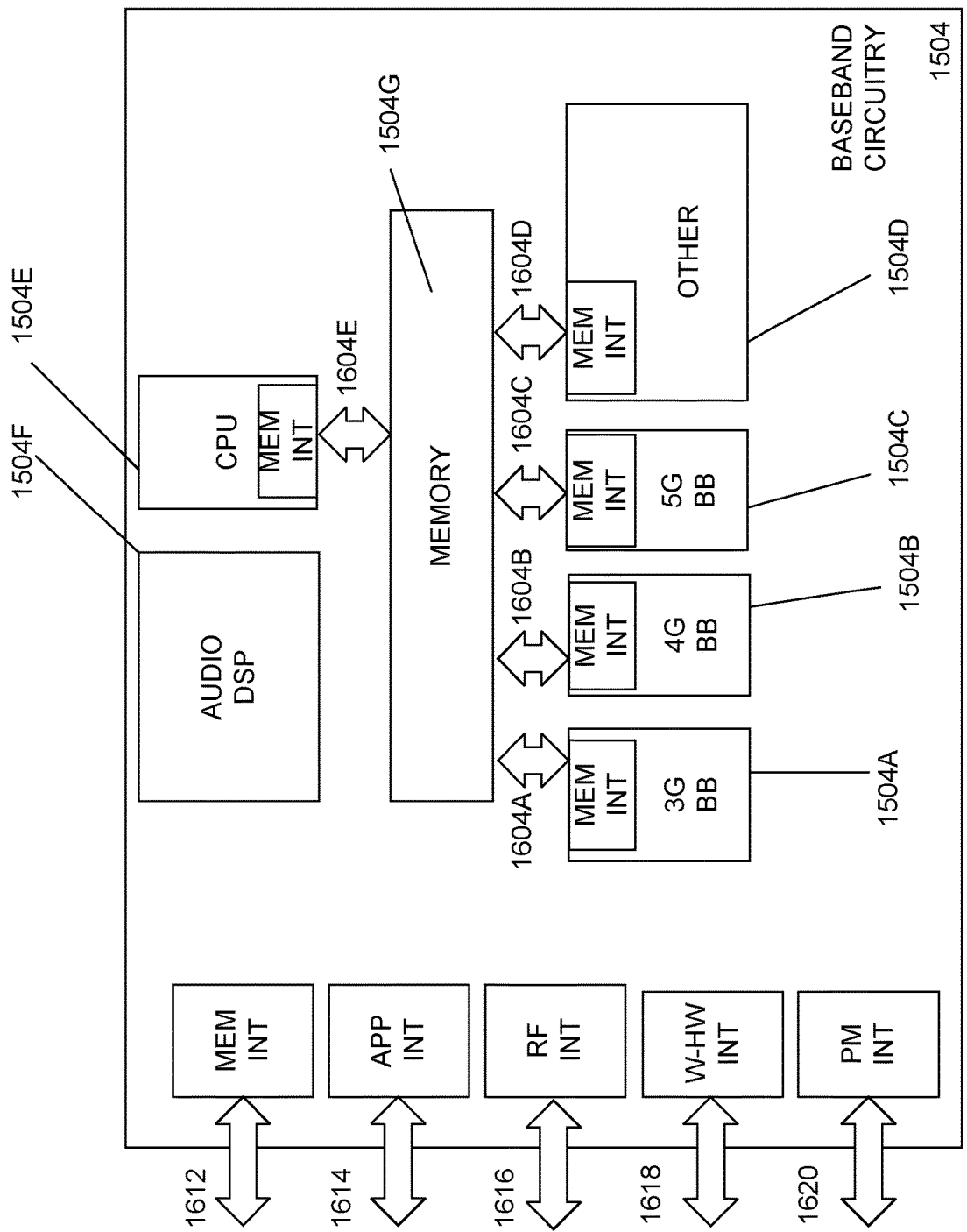
FIG. 16 illustrates example interfaces of baseband circuitry, in accordance with some embodiments of the disclosure.

FIG. 16 illustrates example interfaces of baseband circuitry, in accordance with some embodiments of the disclosure. As discussed above, the baseband circuitry 1504 of FIG. 15 may comprise processors 1504A-1504E and a memory 1504G utilized by said processors. Each of the processors 1504A-1504E may include a memory interface, 1604A-1604E, respectively, to send/receive data to/from the memory 1504G.

The baseband circuitry 1504 may further include one or more interfaces to communicatively couple to other circuitries/devices, such as a memory interface 1612 (e.g., an interface to send/receive data to/from memory external to the baseband circuitry 1504), an application circuitry interface 1614 (e.g., an interface to send/receive data to/from the application circuitry 1502 of FIG. 15), an RF circuitry interface 1616 (e.g., an interface to send/receive data to/from RF circuitry 1506 of FIG. 15), a wireless hardware connectivity interface 1618 (e.g., an interface to send/receive data to/from Near Field Communication (NFC) components, Bluetooth® components (e.g., Bluetooth® Low Energy), Wi-Fi® components, and other communication components), and a power management interface 1620 (e.g., an interface to send/receive power or control signals to/from the PMC 1512.

It is pointed out that elements of any of the Figures herein having reference numbers and/or names that correspond with reference numbers and/or names of any other Figure herein may, in various embodiments, operate or function in a manner similar to those corresponding elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with a fifth-generation Evolved Node B (gNB) on a wireless network, comprising: one or more processors to: process a Tracking Reference Signal (TRS) transmission; process a Synchronization Signal block (SS-block) transmission; and measure a reference signal parameter based on the TRS transmission and the SS-block transmission, and an interface for receiving the TRS transmission and the SS-block transmission from a receiving circuitry.

In example 2, the apparatus of example 1, wherein the TRS transmission is received in the same slot as the SS-block transmission.

In example 3, the apparatus of any of examples 1 through 2, wherein the reference signal parameter is one of: a Reference Signal Received Power (RSRP) measurement; a Channel State Information (CSI) measurement; or a Demodulation Reference Signal (DM-RS) measurement.

In example 4, the apparatus of any of examples 1 through 3, wherein the one or more processors are to: track at least one of a time offset and a frequency offset based on the TRS transmission.

In example 5, the apparatus of any of examples 1 through 4, wherein the one or more processors are to: generate an RSRP report transmission carrying an indicator of the reference signal parameter.

In example 6, the apparatus of any of examples 1 through 5, wherein the TRS transmission and the SS-block transmission are multiplexed in a Frequency Division Multiplexing (FDM) manner.

In example 7, the apparatus of example 6, wherein the TRS transmission spans a number K of Resource Blocks (RBs) and a number L of Orthogonal Frequency Division Multiplexing (OFDM) symbols; and wherein at least one of the number K and the number L is determined by one or more of: a predetermined value; a value configured by higher-layer signaling; or a system bandwidth.

In example 8, the apparatus of example 6, wherein a Resource Block (RB) index of the TRS transmission is determined by: a predetermined value; or a value configured by higher-layer signaling.

In example 9, the apparatus of example 6, wherein a symbol index of the TRS transmission is determined by: a predetermined value; or a value configured by higher-layer signaling.

In example 10, the apparatus of example 6, wherein an Energy Per Resource Element (EPRE) ratio between the TRS transmission and at least one of a Primary Synchronization Signal (PSS), a Secondary Synchronization Signal (SSS), or a Physical Broadcast Control Channel (PBCH) is determined by: a predetermined value; or a value configured by higher-layer signaling.

In example 11, the apparatus of any of examples 1 through 10, wherein the TRS transmission and the SS-block transmission are multiplexed in a Time Division Multiplexing (TDM) manner.

In example 12, the apparatus of any of examples 1 through 11, wherein the TRS transmission is transmitted in one or more Orthogonal Frequency Division Multiplexing (OFDM) symbols either before or after the SS-block transmission, as determined by: a predetermined value; or a value configured by higher-layer signaling.

Example 13 provides a User Equipment (UE) device comprising an application processor, a memory, one or more antennas, a wireless interface for allowing the application processor to communicate with another device, and a touch-screen display, the UE device including the apparatus of any of examples 1 through 12.

Example 14 provides machine readable storage media having machine executable instructions that, when executed, cause one or more processors of a User Equipment (UE) operable to communicate with a fifth-generation Evolved Node B (gNB) on a wireless network to perform an operation comprising: process a Tracking Reference Signal (TRS)

transmission; process a Synchronization Signal block (SS-block) transmission; and measure a reference signal parameter based on the TRS transmission and the SS-block transmission.

In example 15, the machine readable storage media of example 14, wherein the TRS transmission is received in the same slot as the SS-block transmission.

In example 16, the machine readable storage media of any of examples 14 through 15, wherein the reference signal parameter is one of: a Reference Signal Received Power (RSRP) measurement; a Channel State Information (CSI) measurement; or a Demodulation Reference Signal (DM-RS) measurement.

In example 17, the machine readable storage media of any of examples 14 through 16, the operation comprising: track at least one of a time offset and a frequency offset based on the TRS transmission.

In example 18, the machine readable storage media of any of examples 14 through 17, the operation comprising: generate an RSRP report transmission carrying an indicator of the reference signal parameter.

In example 19, the machine readable storage media of any of examples 14 through 18, wherein the TRS transmission and the SS-block transmission are multiplexed in a Frequency Division Multiplexing (FDM) manner.

In example 20, the machine readable storage media of example 19, wherein the TRS transmission spans a number K of Resource Blocks (RBs) and a number L of Orthogonal Frequency Division Multiplexing (OFDM) symbols; and wherein at least one of the number K and the number L is determined by one or more of: a predetermined value; a value configured by higher-layer signaling; or a system bandwidth.

In example 21, the machine readable storage media of example 19, wherein a Resource Block (RB) index of the TRS transmission is determined by: a predetermined value; or a value configured by higher-layer signaling.

In example 22, the machine readable storage media of example 19, wherein a symbol index of the TRS transmission is determined by: a predetermined value; or a value configured by higher-layer signaling.

In example 23, the machine readable storage media of example 19, wherein an Energy Per Resource Element (EPRE) ratio between the TRS transmission and at least one of a Primary Synchronization Signal (PSS), a Secondary Synchronization Signal (SSS), or a Physical Broadcast Control Channel (PBCH) is determined by: a predetermined value; or a value configured by higher-layer signaling.

In example 24, the machine readable storage media of any of examples 14 through 23, wherein the TRS transmission and the SS-block transmission are multiplexed in a Time Division Multiplexing (TDM) manner.

In example 25, the machine readable storage media of any of examples 14 through 24, wherein the TRS transmission is transmitted in one or more Orthogonal Frequency Division Multiplexing (OFDM) symbols either before or after the SS-block transmission, as determined by: a predetermined value; or a value configured by higher-layer signaling.

Example 26 provides an apparatus of a User Equipment (UE) operable to communicate with a fifth-generation Evolved Node B (gNB) on a wireless network, comprising: one or more processors to: generate an Uplink (UL) transmission carrying a Tracking Reference Signal (TRS) request; and process a Downlink (DL) transmission based upon the UL transmission, the DL transmission carrying a TRS response, and an interface for sending the UL transmission to a transmission circuitry and for receiving the DL from a receiving circuitry In example 27, the apparatus of example 26, wherein the TRS request is one of: a request for a TRS transmission; or a request for a TRS reconfiguration transmission.

In example 28, the apparatus of any of examples 26 through 27, wherein the UL transmission is triggered upon at least one of: a determination that no TRS is configured; a determination that a TRS periodicity is above a threshold; a determination that a Block Error Ration (BLER) of a Physical Downlink Shared Channel (PDSCH) falls below a threshold value; a determination that a BLER of a Physical Downlink Control Channel (PDCCH) falls below a threshold value; a determination that a UE Receive (Rx) beam has changed; or a determination that a Discontinuous Reception (DRX) duration is above a threshold value.

In example 29, the apparatus of any of examples 26 through 28, wherein the UL transmission is one of: a Physical Random Access Channel (PRACH) transmission; a Physical Uplink Control Channel (PUCCH) transmission; a Media Access Control (MAC) Control Element (MAC-CE) transmission; a Radio Resource Control (RRC) transmission; or a transmission associated with a beam recovery request.

In example 30, the apparatus of any of examples 26 through 29, wherein the UL transmission carries one or more Quasi-Co-Locate (QCL) indicators corresponding with the TRS response; and wherein the one or more QCL indicators identifies at least one of: a Synchronization Signal block (SS-block) with which the TRS response is to be QCLed; or a Channel State Information Reference Signal (CSI-RS) with which the TRS response is to be QCLed.

In example 31, the apparatus of example 30, wherein the one or more QCL indicators is carried implicitly by at least one of: one or more Physical Random Access Channel (PRACH) time resources; one or more PRACH frequency resources; or one or more PRACH preamble resources.

In example 32, the apparatus of example 30, wherein the one or more QCL indicators is carried explicitly by at least one of: a Physical Uplink Control Channel (PUCCH); or higher-layer signaling.

In example 33, the apparatus of example 30, wherein the UL transmission carries at least one of: an indicator of suggested reconfigured TRS periodicity; an indicator of TRS transmission during paging cycle; or an indicator of TRS transmission during Discontinuous Reception (DRX).

In example 34, the apparatus of any of examples 26 through 33, wherein the UE maintains an indicator of a timing window for TRS response.

In example 35, the apparatus of example 34, wherein, upon an expiration of the timing window for TRS response, the UE may initiate one of: a retransmission of the TRS request; or a TRS reconfiguration request.

In example 36, the apparatus of any of examples 26 through 35, wherein the DL transmission is processed at a slot number n+k; wherein the number n is a slot for at least one of: beam indication signaling; or feedback of beam indication signaling; and the number k may be one of: established by a predetermined value; or configured by higher-layer signaling.

In example 37, the apparatus of any of examples 26 through 36, wherein the DL transmission is transmitted in an active Bandwidth Part (BWP).

Example 38 provides a User Equipment (UE) device comprising an application processor, a memory, one or more antennas, a wireless interface for allowing the application processor to communicate with another device, and a touchscreen display, the UE device including the apparatus of any of examples 26 through 37.

Example 39 provides machine readable storage media having machine executable instructions that, when executed, cause one or more processors of a User Equipment (UE) operable to communicate with a fifth-generation Evolved Node B (gNB) on a wireless network to perform an operation comprising: generate an Uplink (UL) transmission carrying a Tracking Reference Signal (TRS) request; and process a Downlink (DL) transmission based upon the UL transmission, the DL transmission carrying a TRS response.

In example 40, the machine readable storage media of example 39, wherein the TRS request is one of: a request for a TRS transmission; or a request for a TRS reconfiguration transmission.

In example 41, the machine readable storage media of any of examples 39 through 40, wherein the UL transmission is triggered upon at least one of: a determination that no TRS is configured; a determination that a TRS periodicity is above a threshold; a determination that a Block Error Ration (BLER) of a Physical Downlink Shared Channel (PDSCH) falls below a threshold value; a determination that a BLER of a Physical Downlink Control Channel (PDCCH) falls below a threshold value; a determination that a UE Receive (Rx) beam has changed; or a determination that a Discontinuous Reception (DRX) duration is above a threshold value.

In example 42, the machine readable storage media of any of examples 39 through 41, wherein the UL transmission is one of: a Physical Random Access Channel (PRACH) transmission; a Physical Uplink Control Channel (PUCCH) transmission; a Media Access Control (MAC) Control Element (MAC-CE) transmission; a Radio Resource Control (RRC) transmission; or a transmission associated with a beam recovery request.

In example 43, the machine readable storage media of any of examples 39 through 42, wherein the UL transmission carries one or more Quasi-Co-Locate (QCL) indicators corresponding with the TRS response; and wherein the one or more QCL indicators identifies at least one of: a Synchronization Signal block (SS-block) with which the TRS response is to be QCLed; or a Channel State Information Reference Signal (CSI-RS) with which the TRS response is to be QCLed.

In example 44, the machine readable storage media of example 43, wherein the one or more QCL indicators is carried implicitly by at least one of: one or more Physical Random Access Channel (PRACH) time resources; one or more PRACH frequency resources; or one or more PRACH preamble resources.

In example 45, the machine readable storage media of example 43, wherein the one or more QCL indicators is carried explicitly by at least one of: a Physical Uplink Control Channel (PUCCH); or higher-layer signaling.

In example 46, the machine readable storage media of example 43, wherein the UL transmission carries at least one of: an indicator of suggested reconfigured TRS periodicity; an indicator of TRS transmission during paging cycle; or an indicator of TRS transmission during Discontinuous Reception (DRX).

In example 47, the machine readable storage media of any of examples 39 through 46, wherein the UE maintains an indicator of a timing window for TRS response.

In example 48, the machine readable storage media of example 47, wherein, upon an expiration of the timing window for TRS response, the UE may initiate one of: a retransmission of the TRS request; or a TRS reconfiguration request.

In example 49, the machine readable storage media of any of examples 39 through 48, wherein the DL transmission is processed at a slot number n+k; wherein the number n is a slot for at least one of: beam indication signaling; or feedback of beam indication signaling; and the number k may be one of: established by a predetermined value; or configured by higher-layer signaling.

In example 50, the machine readable storage media of any of examples 39 through 49, wherein the DL transmission is transmitted in an active Bandwidth Part (BWP).

In example 51, the apparatus of any of examples 1 through 12, and 26 through 37, wherein the one or more processors comprise a baseband processor.

In example 52, the apparatus of any of examples 1 through 12, and 26 through 37, comprising a memory for storing instructions, the memory being coupled to the one or more processors.

In example 53, the apparatus of any of examples 1 through 12, and 26 through 37, comprising a transceiver circuitry for at least one of: generating transmissions, encoding transmissions, processing transmissions, or decoding transmissions.

In example 54, the apparatus of any of examples 1 through 12, and 26 through 37, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. A User Equipment (UE) operable to communicate with a base station on a wireless network, the UE comprising:
one or more processors configured to trigger a Tracking Reference Signal (TRS) transmission from a base station based on a TRS periodicity being above a threshold; and
receiving circuitry configured to receive a wireless communication having one or more Orthogonal Frequency Division Multiplexing (OFDM) symbols within a plurality of slots, wherein a slot from among the plurality of slots includes the TRS transmission and a Synchronization Signal block (SS-block) transmission, wherein the TRS transmission is allocated to one or more subcarriers in a symbol within the slot and outside resource blocks used for the SS-block transmission in the same symbol in which the TRS transmission is allocated to within the slot, and wherein the one or more subcarriers for the TRS transmission are adjacent to one or more subcarriers for the SS-block transmission;
wherein the one or more processors are further configured to:
process the TRS transmission;
process the SS-block transmission; and
measure a reference signal parameter based on the TRS transmission and the SS-block transmission.
2. The UE of claim 1, wherein the TRS transmission spans a number K of Resource Blocks (RBs) and a number L of OFDM symbols; and wherein at least one of the number K and the number L is determined by a predetermined value, a value configured by higher-layer signaling, or a system bandwidth.

3. The UE of claim 1, wherein a Resource Block (RB) index of the TRS transmission is determined by a predetermined value or a value configured by higher-layer signaling.

4. The UE of claim 1, wherein a symbol index of the TRS transmission is determined by a predetermined value or a value configured by higher-layer signaling.

5. The UE of claim 1, wherein an Energy Per Resource Element (EPRE) ratio between the TRS transmission and at least one of a Primary Synchronization Signal (PSS), a Secondary Synchronization Signal (SSS), or a Physical Broadcast Control Channel (PBCH) is determined by a predetermined value or a value configured by higher-layer signaling.

6. The UE of claim 1, wherein the TRS transmission and the SS-block transmission are multiplexed in a Time Division Multiplexing (TDM) manner.

7. The UE of claim 1, wherein the TRS transmission is transmitted in the one or more OFDM symbols as determined by a predetermined value or a value configured by higher-layer signaling.

8. The UE of claim 1, wherein the one or more processors are configured to trigger the TRS transmission when a UE receive (Rx) beam changes.

9. The UE of claim 1, wherein the one or more processors are configured to track at least one of a time offset or a frequency offset based on the TRS transmission.

10. A User Equipment (UE) operable to communicate with a base station on a wireless network, the UE comprising:
one or more processors configured to:
generate an Uplink (UL) transmission carrying a Tracking Reference Signal (TRS) request to trigger a TRS transmission from a base station based on a TRS periodicity being above a threshold; and
process a Downlink (DL) transmission based upon the UL transmission, the DL transmission carrying a TRS transmission, the DL transmission having one or more Orthogonal Frequency Division Multiplexing (OFDM) symbols within a plurality of slots, wherein a slot from among the plurality of slots includes the TRS transmission and a Synchronization Signal block (SS-block) transmission, and the TRS transmission is allocated to one or more subcarriers in a symbol within the slot and outside resource blocks used for the SS-block transmission in the same symbol in which the TRS transmission is allocated to within the slot, and wherein the one or more subcarriers for the TRS transmission are adjacent to one or more subcarriers for the SS-block transmission; and
transmitting circuitry configured to transmit the TRS request and to re-transmit the TRS request in response to the TRS response not being received within a time window.

11. A non-transitory machine readable storage media having machine executable instructions stored thereon that, when executed, cause one or more processors of a User Equipment (UE) operable to communicate with a base station on a wireless network to perform one or more operations, the one or more operations comprising:
triggering a Tracking Reference Signal (TRS) transmission from a base station based on a TRS periodicity being above a threshold;
receiving a wireless communication having one or more Orthogonal Frequency Division Multiplexing (OFDM) symbols within a plurality of slots, wherein a slot from among the plurality of slots includes the TRS transmission and a Synchronization Signal block (SS-block) transmission, wherein the TRS transmission is allocated to one or more subcarriers in a symbol within the slot and outside resource blocks used for the SS-block transmission in the same symbol in which the TRS transmission is allocated to within the slot, and wherein the one or more subcarriers for the TRS transmission are adjacent to one or more subcarriers for the SS-block transmission;
processing the TRS transmission;
processing the SS-block transmission; and
measuring a reference signal parameter based on the TRS transmission and the SS-block transmission.

12. The non-transitory machine readable storage media of claim 11, wherein the TRS transmission spans a number K of Resource Blocks (RBs) and a number L of OFDM symbols; and
wherein at least one of the number K and the number L is determined by a predetermined value, a value configured by higher-layer signaling, or a system bandwidth.

13. The non-transitory machine readable storage media of claim 11, wherein a Resource Block (RB) index of the TRS transmission is determined by a predetermined value or a value configured by higher-layer signaling.

14. The non-transitory machine readable storage media of claim 11, wherein a symbol index of the TRS transmission is determined by a predetermined value or a value configured by higher-layer signaling.

15. The non-transitory machine readable storage media of claim 11, wherein an Energy Per Resource Element (EPRE) ratio between the TRS transmission and at least one of a Primary Synchronization Signal (PSS), a Secondary Synchronization Signal (SSS), or a Physical Broadcast Control Channel (PBCH) is determined by a predetermined value or a value configured by higher-layer signaling.

16. The non-transitory machine readable storage media of claim 11, wherein the TRS transmission and the SS-block transmission are multiplexed in a Time Division Multiplexing (TDM) manner.

17. The non-transitory machine readable storage media of claim 11, wherein the TRS transmission is transmitted in the one or more OFDM symbols as determined by a predetermined value or a value configured by higher-layer signaling.

18. The UE of claim 10, wherein the one or more processors are configured to track at least one of a time offset or a frequency offset based on the TRS transmission.

19. The UE of claim 18, wherein the one or more processors are further configured to trigger the UL transmission based upon at least one of:
a determination that no TRS is configured;
a determination that a Block Error Ration (BLER) of a Physical Downlink Shared Channel (PDSCH) falls below a threshold value;
a determination that a BLER of a Physical Downlink Control Channel (PDCCH) falls below a threshold value;
a determination that a UE Receive (Rx) beam has changed; or
a determination that a Discontinuous Reception (DRX) duration is above a threshold value.

20. The UE of claim 18, wherein the UL transmission is one of:
  a Physical Random Access Channel (PRACH) transmission;
  a Physical Uplink Control Channel (PUCCH) transmission;
  a Media Access Control (MAC) Control Element (MAC-CE) transmission;
  a Radio Resource Control (RRC) transmission; or
  a transmission associated with a beam recovery request.

21. The UE of claim 10, wherein the one or more processors are configured to generate the UL transmission to carry one or more Quasi-Co-Locate (QCL) indicators corresponding with the TRS response; and
  wherein the one or more QCL indicators are configured to identify at least one of: a Synchronization Signal block (SS-block) with which the TRS response is to be QCLed or a Channel State Information Reference Signal (CSI-RS) with which the TRS response is to be QCLed.

22. A non-transitory machine readable storage media having machine executable instructions stored thereon that, when executed, cause one or more processors of a User Equipment (UE) operable to communicate with a base station on a wireless network to perform one or more operations, the one or more operations comprising:
  generating an Uplink (UL) transmission carrying a Tracking Reference Signal (TRS) request to trigger a TRS transmission from a base station based on a TRS periodicity being above a threshold;
  transmitting the TRS request, the TRS request being re-transmitted in response to the TRS response not being received within a time window; and
  processing a Downlink (DL) transmission based upon the UL transmission, the DL transmission carrying a TRS transmission, the DL transmission having one or more Orthogonal Frequency Division Multiplexing (OFDM) symbols within a plurality of slots, wherein a slot from among the plurality of slots includes the TRS transmission and a Synchronization Signal block (SS-block) transmission, and the TRS transmission is allocated to one or more subcarriers in a symbol within the slot and outside resource blocks used for the SS-block transmission in the same symbol in which the TRS transmission is allocated to within the slot, and wherein the one or more subcarriers for the TRS transmission are adjacent to one or more subcarriers for the SS-block transmission.

23. The non-transitory machine readable storage media of claim 22, wherein the one or more operations further comprise triggering the UL transmission upon at least one of:
  a determination that no TRS is configured;
  a determination that a Block Error Ration (BLER) of a Physical Downlink Shared Channel (PDSCH) falls below a threshold value;
  a determination that a BLER of a Physical Downlink Control Channel (PDCCH) falls below a threshold value;
  a determination that a UE Receive (Rx) beam has changed; or
  a determination that a Discontinuous Reception (DRX) duration is above a threshold value.

24. The non-transitory machine readable storage media of claim 22, wherein the UL transmission is one of:
  a Physical Random Access Channel (PRACH) transmission;
  a Physical Uplink Control Channel (PUCCH) transmission;
  a Media Access Control (MAC) Control Element (MAC-CE) transmission;
  a Radio Resource Control (RRC) transmission; or
  a transmission associated with a beam recovery request.

25. The non-transitory machine readable storage media of claim 22, wherein the generating comprises generating the UL transmission to carry one or more Quasi-Co-Locate (QCL) indicators corresponding with the TRS response; and
  wherein the one or more QCL indicators identifies at least one of: a Synchronization Signal block (SS-block) with which the TRS response is to be QCLed or a Channel State Information Reference Signal (CSI-RS) with which the TRS response is to be QCLed.

* * * * *